US012395978B2

(12) United States Patent
Liu et al.

(10) Patent No.: US 12,395,978 B2
(45) Date of Patent: Aug. 19, 2025

(54) INTER-USER EQUIPMENT (UE) COORDINATION FOR SIDELINK IN AN UNLICENSED OR SHARED SPECTRUM

(71) Applicant: QUALCOMM Incorporated, San Diego, CA (US)

(72) Inventors: Chih-Hao Liu, San Diego, CA (US); Jing Sun, San Diego, CA (US); Xiaoxia Zhang, San Diego, CA (US); Yisheng Xue, San Diego, CA (US); Giovanni Chisci, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 442 days.

(21) Appl. No.: 17/951,539

(22) Filed: Sep. 23, 2022

(65) Prior Publication Data
US 2024/0114502 A1 Apr. 4, 2024

(51) Int. Cl.
H04W 4/00 (2018.01)
H04W 72/121 (2023.01)

(52) U.S. Cl.
CPC ................ H04W 72/121 (2013.01)

(58) Field of Classification Search
CPC .............. H04W 16/02; H04W 72/121; H04W 72/0446; H04W 72/0453; H04W 72/40; H04W 72/02; H04W 72/25; H04W 76/14
See application file for complete search history.

(56) References Cited

U.S. PATENT DOCUMENTS 12,096,281 B2 * 9/2024 Elazzouni ............. H04L 47/801
2020/0107172 A1 * 4/2020 Bharadwaj .............. H04W 4/44
(Continued)

FOREIGN PATENT DOCUMENTS

EP         4274348 A1 * 11/2023 ........... H04L 1/1812
WO    WO-2019033389 A1    2/2019
(Continued)

OTHER PUBLICATIONS

Apple: "On Remaining Issues of Inter-UE Coordination", R1-2200426, 3rd Generation Partnership Project, Mobile Competence Centre, 650, Route Des Lucioles, F-06921 Sophia-Antipolis Cedex, France, vol. RAN WG1, No. e-Meeting, Jan. 17, 2022-Jan. 25, 2022, Jan. 11, 2022, 17 Pages, XP052093178, paragraphs [02.1], [2.1.1.2], [2.1.1.3], [2.1.3], [2.1.4], [2.1.5], [2.1.6].
(Continued)

Primary Examiner — Thai Dinh Hoang
(74) Attorney, Agent, or Firm — Arun Swain

(57) ABSTRACT

Methods, systems, and devices for wireless communications are described. A first user equipment (UE) may receive an inter-UE coordination request message from a second UE, the inter-UE coordination request message identifying a request for resource scheduling information for the first UE, the second UE, or both. The first UE may transmit an inter-UE coordination response message comprising the scheduling information to the second UE, the scheduling information comprising an indication of one or more of a resource block set and interlacing pattern frequency configuration for multi-slot burst communications between the first UE and the second UE or a starting slot and slot burst length configuration for the multi-slot burst communications between the first UE and the second UE.

30 Claims, 12 Drawing Sheets

(56) References Cited

U.S. PATENT DOCUMENTS

| | | | | |
|---|---|---|---|---|
| 2020/0154440 A1* | 5/2020 | Gholmieh | ............... | H04W 4/40 |
| 2020/0235891 A1* | 7/2020 | Lei | ......................... | H04L 5/001 |
| 2024/0056991 A1* | 2/2024 | Ryu | ................... | H04W 52/281 |
| 2024/0314812 A1* | 9/2024 | Zhao | ..................... | H04L 5/0044 |

FOREIGN PATENT DOCUMENTS

| | | | | |
|---|---|---|---|---|
| WO | WO-2024064055 A1 * | 3/2024 | .......... | H04W 72/121 |
| WO | WO-2025034872 A1 * | 2/2025 | ............ | H04W 72/02 |

OTHER PUBLICATIONS

International Search Report and Written Opinion—PCT/US2023/032998—ISA/EPO—Dec. 7, 2023.

LG Electronics: "Discussion on Feasibility and Benefits for Mode 2 Enhancements", R1-2100518, 3GPP TSG RAN WG1 Meeting #104-e, 3rd Generation Partnership Project, Mobile Competence Centre, 650, Route Des Lucioles, F-06921, Sophia-Antipolis Cedex, France, vol. RAN WG1, No. e-Meeting, Jan. 25, 2021-Feb. 5, 2021, Jan. 19, 2021, XP051971027, 26 pages, p. 7, line 5-p. 11, line 5.

* cited by examiner

INTER-USER EQUIPMENT (UE) COORDINATION FOR SIDELINK IN AN UNLICENSED OR SHARED SPECTRUM

FIELD OF TECHNOLOGY

The following relates to wireless communication, including inter-user equipment (UE) coordination for sidelink in an unlicensed or shared spectrum.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

The described techniques relate to improved methods, systems, devices, and apparatuses that support inter-user equipment (UE) coordination (IUC) for sidelink in an unlicensed or shared spectrum. For example, the described techniques provide IUC techniques with improved resource signaling for inter-UE communications. A first UE may wirelessly communicate with a second UE (e.g., using a sidelink or PC5 interface). The first UE may receive or otherwise obtain an IUC request message from the second UE. The IUC request message may carry or otherwise convey information identifying a request for resource scheduling information for the first UE, the second UE, or both the first UE and second UE. For example, the IUC request message may indicate preferred resources for use and/or non-preferred resources to be avoided for the first UE, the second UE, or both UE. The first UE may transmit or otherwise provide an IUC response message to the second UE. The IUC response message may carry or otherwise convey an indication of the scheduling information to the second UE. The scheduling information may include, for example, an indication of a resource block (RB) set and interlacing pattern frequency configuration, a starting slot and slot burst length configuration, or both, for multi-slot burst communications between the first UE and the second UE.

A method for wireless communication at a first UE is described. The method may include receiving an IUC request message from a second UE, the IUC request message identifying a request for resource scheduling information for the first UE, the second UE, or both and transmitting an IUC response message including the scheduling information to the second UE, the scheduling information including an indication of one or more of a RB set and interlacing pattern frequency configuration for multi-slot burst communications between the first UE and the second UE or a starting slot and slot burst length configuration for the multi-slot burst communications between the first UE and the second UE.

An apparatus for wireless communication at a first UE is described. The apparatus may include a processor, memory in electronic communication with the processor, and instructions stored in the memory. The instructions may be executable by the processor to receive an IUC request message from a second UE, the IUC request message identifying a request for resource scheduling information for the first UE, the second UE, or both and transmit an IUC response message including the scheduling information to the second UE, the scheduling information including an indication of one or more of a RB set and interlacing pattern frequency configuration for multi-slot burst communications between the first UE and the second UE or a starting slot and slot burst length configuration for the multi-slot burst communications between the first UE and the second UE.

Another apparatus for wireless communication at a first UE is described. The apparatus may include means for receiving an IUC request message from a second UE, the IUC request message identifying a request for resource scheduling information for the first UE, the second UE, or both and means for transmitting an IUC response message including the scheduling information to the second UE, the scheduling information including an indication of one or more of a RB set and interlacing pattern frequency configuration for multi-slot burst communications between the first UE and the second UE or a starting slot and slot burst length configuration for the multi-slot burst communications between the first UE and the second UE.

A non-transitory computer-readable medium storing code for wireless communication at a first UE is described. The code may include instructions executable by a processor to receive an IUC request message from a second UE, the IUC request message identifying a request for resource scheduling information for the first UE, the second UE, or both and transmit an IUC response message including the scheduling information to the second UE, the scheduling information including an indication of one or more of a RB set and interlacing pattern frequency configuration for multi-slot burst communications between the first UE and the second UE or a starting slot and slot burst length configuration for the multi-slot burst communications between the first UE and the second UE.

Some examples of the method, apparatuses, and non-transitory computer-readable medium described herein may further include operations, features, means, or instructions for identifying, based on the IUC request message, a first RB set and interlacing pattern frequency configuration and a first starting slot and slot burst length configuration for the multi-slot burst communications between the first UE and the second UE, where the indicated RB set and interlacing pattern frequency configuration may be based on the first RB set and interlacing pattern frequency configuration and the indicated starting slot and the slot burst length configuration may be based on the first starting slot and slot burst length configuration.

In some examples of the method, apparatuses, and non-transitory computer-readable medium described herein, the first RB set and interlacing pattern frequency configuration include a field indicating the starting RB set and number of continuous RB sets or a bitmap where each bit in the bitmap may be configured to indicate the starting RB set and continuous or discontinuous RB sets.

In some examples of the method, apparatuses, and non-transitory computer-readable medium described herein, the first RB set and interlacing pattern frequency configuration includes a starting RB set with a number of continuous or discontinuous RB sets and an interlacing pattern for the starting RB set and continuous or discontinuous RB sets.

In some examples of the method, apparatuses, and non-transitory computer-readable medium described herein, the first starting slot and slot burst length configuration includes a timing resource indication value identifying the starting slot and a number of slots included for multi-slot burst communications between the first UE and the second UE.

In some examples of the method, apparatuses, and non-transitory computer-readable medium described herein, transmitting the IUC response message may include operations, features, means, or instructions for transmitting, in the IUC response message, the indication of the starting slot and slot burst length configuration that includes a timing resource indication value identifying the starting slot and a number of slots included for multi-slot burst communications between the first UE and the second UE.

In some examples of the method, apparatuses, and non-transitory computer-readable medium described herein, the indication of the number of slots included for multi-slot burst communications includes a shared indication of the number of slots that may be included in each instance of the multi-slot burst communications, a first indication of the number of slots that may be included in a first instance of the multi-slot burst communications and a second indication of the number of slots that may be included in one or more additional instances of the multi-slot burst communications, or a separate indication of the number of slots that may be included for each instance of the multi-slot burst communications.

In some examples of the method, apparatuses, and non-transitory computer-readable medium described herein, the indication of the number of slots included for the multi-slot burst communication includes one or more fields indicating the number of slots included for the multi-slot burst communications, where each field of the one or more fields may have a shared field length or a different field length.

In some examples of the method, apparatuses, and non-transitory computer-readable medium described herein, the indication of the timing resource indication value includes an earliest starting slot for the multi-slot burst communications.

In some examples of the method, apparatuses, and non-transitory computer-readable medium described herein, transmitting the IUC response message may include operations, features, means, or instructions for transmitting, in the IUC response message, the indication of the RB set and interlacing pattern frequency configuration that includes a starting RB set with a number of continuous or discontinuous RB sets and an interlacing pattern for the starting RB set and continuous or discontinuous RB sets.

In some examples of the method, apparatuses, and non-transitory computer-readable medium described herein, the indication of the interlacing pattern includes an interlacing pattern for a starting interlacing pattern for a first instance of the multi-slot burst communications and a shared offset value identifying the offset between each instance of the multi-slot burst communications.

In some examples of the method, apparatuses, and non-transitory computer-readable medium described herein, the indication of the interlacing pattern includes a bitmap where each bit in the bitmap may be configured to identify a starting interlacing pattern for a first instance of the multi-slot burst communications and a separate offset value for each subsequent instance of the multi-slot burst communications identifying the offset between each instance.

A method for wireless communication at a second UE is described. The method may include transmitting an IUC request message from a first UE, the IUC request message identifying a request for resource scheduling information for the first UE, the second UE, or both and receiving an IUC response message including the scheduling information from the first UE, the scheduling information including an indication of one or more of a RB set and interlacing pattern frequency configuration for multi-slot burst communications between the first UE and the second UE or a starting slot and slot burst length configuration for the multi-slot burst communications between the first UE and the second UE.

An apparatus for wireless communication at a second UE is described. The apparatus may include a processor, memory in electronic communication with the processor, and instructions stored in the memory. The instructions may be executable by the processor to transmit an IUC request message from a first UE, the IUC request message identifying a request for resource scheduling information for the first UE, the second UE, or both and receive an IUC response message including the scheduling information from the first UE, the scheduling information including an indication of one or more of a RB set and interlacing pattern frequency configuration for multi-slot burst communications between the first UE and the second UE or a starting slot and slot burst length configuration for the multi-slot burst communications between the first UE and the second UE.

Another apparatus for wireless communication at a second UE is described. The apparatus may include means for transmitting an IUC request message from a first UE, the IUC request message identifying a request for resource scheduling information for the first UE, the second UE, or both and means for receiving an IUC response message including the scheduling information from the first UE, the scheduling information including an indication of one or more of a RB set and interlacing pattern frequency configuration for multi-slot burst communications between the first UE and the second UE or a starting slot and slot burst length configuration for the multi-slot burst communications between the first UE and the second UE.

A non-transitory computer-readable medium storing code for wireless communication at a second UE is described. The code may include instructions executable by a processor to transmit an IUC request message from a first UE, the IUC request message identifying a request for resource scheduling information for the first UE, the second UE, or both and receive an IUC response message including the scheduling information from the first UE, the scheduling information including an indication of one or more of a RB set and interlacing pattern frequency configuration for multi-slot burst communications between the first UE and the second UE or a starting slot and slot burst length configuration for the multi-slot burst communications between the first UE and the second UE.

Some examples of the method, apparatuses, and non-transitory computer-readable medium described herein may further include operations, features, means, or instructions for identifying, based on the IUC request message, a first RB set and interlacing pattern frequency configuration and a first starting slot and slot burst length configuration for the multi-slot burst communications between the first UE and the second UE, where the indicated RB set and interlacing pattern frequency configuration may be based on the first RB set and interlacing pattern frequency configuration and the indicated starting slot and the slot burst length configuration may be based on the first starting slot and slot burst length configuration.

In some examples of the method, apparatuses, and non-transitory computer-readable medium described herein, the first RB set and interlacing pattern frequency configuration include a field indicating the starting RB set and number of continuous RB sets or a bitmap where each bit in the bitmap may be configured to indicate the starting RB set and continuous or discontinuous RB sets.

In some examples of the method, apparatuses, and non-transitory computer-readable medium described herein, the first RB set and interlacing pattern frequency configuration includes a starting RB set with a number of continuous or discontinuous RB sets and an interlacing pattern for the starting RB set and continuous or discontinuous RB sets.

In some examples of the method, apparatuses, and non-transitory computer-readable medium described herein, the first starting slot and slot burst length configuration includes a timing resource indication value identifying the starting slot and a number of slots included for multi-slot burst communications between the first UE and the second UE.

Some examples of the method, apparatuses, and non-transitory computer-readable medium described herein may further include operations, features, means, or instructions for identifying, based on the IUC response message, the indication of the starting slot and slot burst length configuration that includes a timing resource indication value identifying the starting slot and a number of slots included for multi-slot burst communications between the first UE and the second UE.

In some examples of the method, apparatuses, and non-transitory computer-readable medium described herein, the indication of the number of slots included for multi-slot burst communications includes a shared indication of the number of slots that may be included in each instance of the multi-slot burst communications, a first indication of the number of slots that may be included in a first instance of the multi-slot burst communications and a second indication of the number of slots that may be included in one or more additional instances of the multi-slot burst communications, or a separate indication of the number of slots that may be included for each instance of the multi-slot burst communications.

In some examples of the method, apparatuses, and non-transitory computer-readable medium described herein, the indication of the number of slots included for the multi-slot burst communication includes one or more fields indicating the number of slots included for the multi-slot burst communications, where each field of the one or more fields may have a shared field length or a different field length.

In some examples of the method, apparatuses, and non-transitory computer-readable medium described herein, the indication of the timing resource indication value includes an earliest starting slot for the multi-slot burst communications.

Some examples of the method, apparatuses, and non-transitory computer-readable medium described herein may further include operations, features, means, or instructions for identifying, based at lest in part on the IUC response message, the indication of the RB set and interlacing pattern frequency configuration that includes a starting RB set with a number of continuous or discontinuous RB sets and an interlacing pattern for the starting RB set and continuous or discontinuous RB sets.

In some examples of the method, apparatuses, and non-transitory computer-readable medium described herein, the indication of the interlacing pattern includes an interlacing pattern for a starting interlacing pattern for a first instance of the multi-slot burst communications and a shared offset value identifying the offset between each instance of the multi-slot burst communications.

In some examples of the method, apparatuses, and non-transitory computer-readable medium described herein, the indication of the interlacing pattern includes a bitmap where each bit in the bitmap may be configured to identify a starting interlacing pattern for a first instance of the multi-slot burst communications and a separate offset value for each subsequent instance of the multi-slot burst communications identifying the offset between each instance.

DETAILED DESCRIPTION

Figure 1:
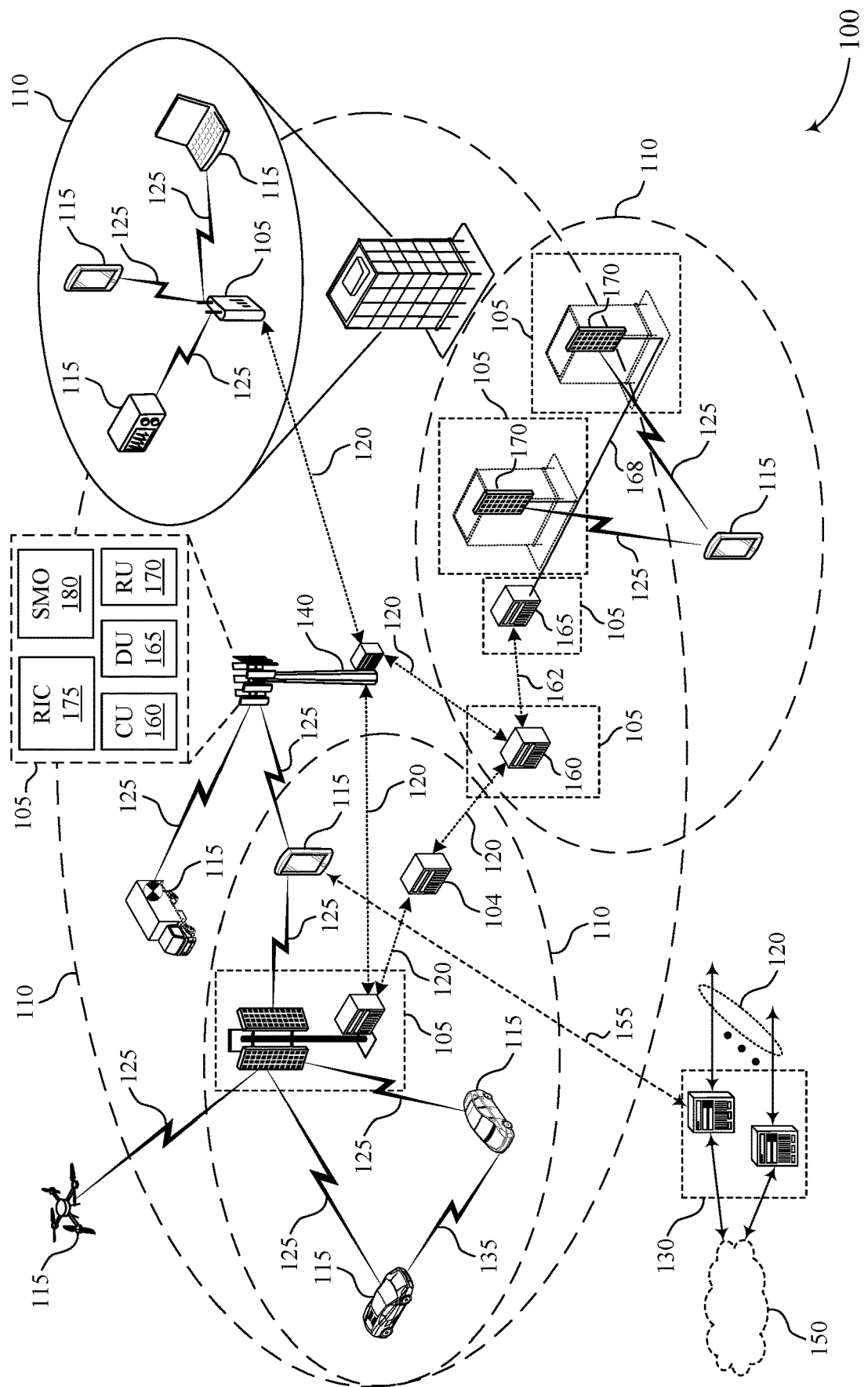
FIG. 1 illustrates an example of a wireless communications system that supports inter-UE coordination for sidelink in an unlicensed or shared spectrum in accordance with one or more aspects of the present disclosure.

Wireless networks may support inter-user equipment (UE) coordination (IUC) between UEs. For example, a first UE may communicate with a second UE over a sidelink. The first UE may transmit an IUC message to the second UE identifying a set of preferred resources, or a set of non-preferred resources, that may be used for scheduling decisions by the second UE. The preferred or non-preferred resources may include resources associated with the first UE or resources associated with the second UE.

The first UE may send the IUC message as a response to an IUC request message received from the second UE. The IUC request message may also indicate the preferred resources or non-preferred resources associated with the first UE or the second UE.

However, in some situations the communications between the UE may include multi-slot burst communications performed using one or more resource block (RB) sets. Moreover, different instances of the communications may be repeated across multiple slots according to a burst pattern. Conventional IUC techniques do not provide a mechanism for the first UE or the second UE to indicate (e.g., in the IUC request message and/or in the IUC response message) timing and frequency information supporting multi-slot burst communications between the UE (e.g., signaling RB set information as well as the repetition and offset information).

The described techniques relate to improved methods, systems, devices, and apparatuses that support inter-UE coordination for sidelink in an unlicensed or shared spectrum. For example, the described techniques provide for improved IUC techniques improving resource configurations for inter-UE communications. A first UE may be performing communications with a second UE (e.g., using cellular, Uu interface, techniques and/or using sidelink, PC5 interface, techniques). The first UE may receive or otherwise obtain an IUC request message from the second UE. The IUC request message may carry or otherwise convey information identifying a request for resource scheduling information for the first UE, the second UE, or both the first UE and second UE. For example, the IUC request message may indicate preferred resources and/or resources to be avoided for the first UE, the second UE, or both UE. The first UE may transmit or otherwise provide an IUC response message to the second UE. The IUC response message may carry or otherwise convey an indication of the scheduling information to the second UE. The scheduling information may include an indication of a RB set and interlacing pattern frequency configuration, a starting slot and slot burst length configuration, or both, for multi-slot burst communications between the first UE and the second UE.

Aspects of the disclosure are initially described in the context of wireless communications systems. Aspects of the disclosure are further illustrated by and described with reference to apparatus diagrams, system diagrams, and flowcharts that relate to IUC for sidelink in an unlicensed or shared spectrum.

FIG. 1 illustrates an example of a wireless communications system 100 that supports IUC for sidelink in an unlicensed or shared spectrum in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more radio access technologies (RATs).

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support IUC for sidelink in an unlicensed or shared spectrum as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof.

For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a receiving device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

A first UE (e.g., UE 115) may receive an IUC request message from a second UE (e.g., a different UE 115), the IUC request message identifying a request for resource scheduling information for the first UE, the second UE, or both. The first UE may transmit an IUC response message including the scheduling information to the second UE. The scheduling information may include an indication of one or more of: a RB set and interlacing pattern frequency for multi-slot burst communications between the first UE and the second UE or a starting slot and slot burst length for the multi-slot burst communications between the first UE and the second UE.

The second UE (e.g., the other UE 115) may transmit an IUC request message from a first UE, the IUC request message identifying a request for resource scheduling information for the first UE, the second UE, or both. The second UE may receive an IUC response message including the scheduling information from the first UE. The scheduling information may include an indication of one or more of a RB set and interlacing pattern frequency for multi-slot burst communications between the first UE and the second UE or a starting slot and slot burst length for the multi-slot burst communications between the first UE and the second UE.

Figure 2:
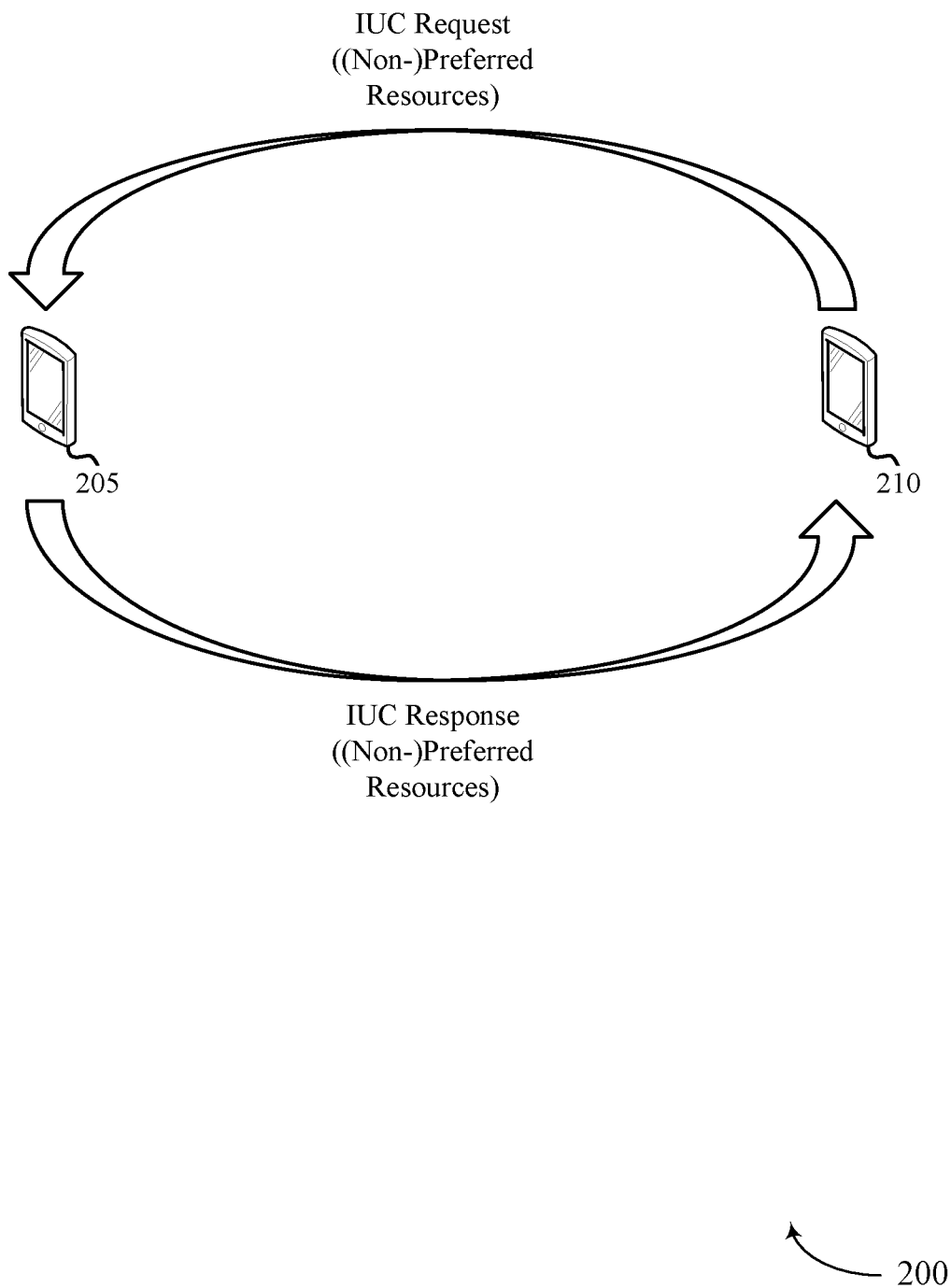
FIG. 2 illustrates an example of a wireless communication system that supports inter-UE coordination for sidelink in an unlicensed or shared spectrum in accordance with one or more aspects of the present disclosure.

FIG. 2 illustrates an example of a wireless communications system 200 that supports IUC for sidelink in an unlicensed or shared spectrum in accordance with one or more aspects of the present disclosure. Wireless communications system 200 may implement aspects of wireless communication system 100. Wireless communications system 200 may include UE 205 and UE 210, which may be examples of the corresponding devices described herein. That is, UE 205 and UE 210 may each be examples of a UE. However, UE 205 may also be referred to as a first UE while UE 210 may also be referred to as a second UE. References to the first UE or the second UE are meant to distinguish between a UE transmitting an IUC request message and the UE transmitting an IUC response message. In the non-limiting example illustrated in FIG. 2, UE 210 transmits the IUC request message (e.g., refers to the second UE) and UE 205 transmits the IUC response message (e.g., refers to the first UE).

Wireless communications system 200 may support IUC between UE 205 and UE 210. Generally, IUC techniques (such as the techniques described herein) may be employed to improve wireless communications broadly. For example, IUC techniques may be triggered by a certain condition occurring for a particular UE (e.g., one UE experiences a threshold interference from another UE) or more broadly for the network (e.g., increased network traffic may lead to a need for improved coordination between UE). In some examples, the IUC techniques are triggered by an IUC request message. The IUC techniques may generally be enabled or disabled by the network (e.g., using RRC signaling, medium access control-control element (MAC-CE) signaling, or downlink control information (DCI) signaling). The result if the IUC may improve communications between the coordinating UE or may improve communications between one of the coordinating UE that is communicating with different UE or network entity. The IUC techniques may be employed for cellular communications (e.g., Uu interface), for sidelink communications (e.g., PC5 interface), or for other communication protocols.

IUC techniques according to the request-based triggering approach may include the second UE (UE 210 in this example) transmitting or otherwise providing an IUC request message to the first UE (UE 205 in this example). In some examples, the second UE uses the IUC request message to indicate its preferred resources. For example, the first UE may be the intended receiver of the second UE. In this scenario, the second UE may want to use resources determined as being available from the perspective of the second UE. This may enable the second UE to perform transmit resource selection based on the physical layer channel sensing determined by the second UE. When determining the preferred resource set indicated in the IUC request, the first UE typically applies a legacy resource selection procedure using the parameters provided in IUC request (e.g., the request for resource scheduling information). For example, the first UE may exclude candidate single-slot resource(s) belonging to slot(s) where the first UE does not expect to perform sidelink reception of a transport block due to half-duplex operations.

In some examples, the IUC request message may signal or otherwise indicate non-preferred resources. For example, if the first UE is an intended receiver from the second UE, the second UE may want to know in what resources the first UE is receiving a high amount of interference from nearby UEs so that second UE can avoid those resources. In the situation where the first UE is not the intended receiver of the second UE, the second UE may not want to create interference for the first UE, and therefore want to know which resources to avoid or to minimize interference to the first UE. Accordingly, the IUC request message may carry or otherwise convey a request for scheduling information (e.g., resource(s)) for the first UE, the second UE, or both UE.

The IUC may occur between the first UE and the second UE using various signaling techniques. For example, the IUC request message may be signaled using a sidelink control information (SCI) two (SCI 2) message, MAC-CE signaling, or other signaling techniques. A SCI message format 2-C may include all the same fields in an SCI message format 2-A, with the exception of a cast type indicator. For example, the IUC request may include a resource pool level (pre-)configuration, which may enable one of the following alternatives. A first alternative may include the MAC CE and SCI 2 being used as the container of an explicit IUC request transmission from the second UE to the first UE. When both SCI format 2-C and MAC-CE are used as the container of an explicit IUC request for IUC information, the same bit field size used for conveying the request in a SCI format 2-C may be applied to the MAC-CE. In some examples, the SCI message format 2-C may be optional for the receiving UE. It is typically up to UE implementation whether to use MAC-CE signaling or to additionally SCI 2 signaling. A second alternative may include MAC-CE signaling being used as the container of an explicit IUC request transmission. When MAC-CE signaling is used as the container of the explicit IUC request requesting IUC information, the same bit field size for the IUC request message in an SCI 2 may be applied to the MAC-CE signaling.

For example, conventional IUC request messages (e.g., using the MAC-CE or MAC-CE and SCI 2 signaling) may include bit(s) indicating whether the IUC request is a request for (non-)preferred resources or is providing (non-)preferred resources (e.g., Providing/requesting indicator). The IUC request message may include bit(s) indicating a priority for the IUC request. The IUC request message may include bit(s) indicating the number of subchannels (e.g., the (non-) preferred resources of the first or second UE). For example, the IUC request message may indicate: $\lceil \log_2 N_{subChannel}^{SL} \rceil$, where $N_{subChannel}^{SL}$ is provided by the higher layer parameter sl-NumSubchannel. The IUC request message may include an indication of a resource reservation period. For example, the IUC request message may indicate Y, where $Y=\lceil \log_2 N_{rsv\_period} \rceil$, with $N_{rsv\_period}$ being the number of entries in the higher layer parameter sl-ResourceReservePeriodList, if the higher layer parameter sl-MultiReserveResource is configured. Otherwise Y=0. The IUC request message may indicate a resource selection window location that identifies the slots to be used for sensing (e.g., slots $n+T_1$ and $n+T_2$). For example, the IUC request message may indicate $2(10+\lceil \log_2(10*2^u) \rceil)$, where u is 0, 1, 2, or 3, for SCS of 15 kHz, 30 kHz, 60 kHz, or 120 kHz, respectively. The IUC request message may include a resource set type that uses bit(s) to indicate whether the IUC request is for preferred resources or for non-preferred resources (e.g., when the parameter determineResourceSetTypeScheme1 is set to "UE-B's request." Otherwise, no bits may be allocated to the resource set type field.

Accordingly, both MAC-CE and SCI 2 may be use for conveying the IUC request message, as well as the IUC response message, with both the MAC-CE and SCI 2 formats using the same or similar fields. Each (non-)preferred resource indicated in the IUC request message and/or the IUC response message may indicate a timing resource indicator value (TRIV), frequency resource indicator value (FRIV), as well as a resource repetition indicator (RRI) identifying the offsets between repetitions of the first resource combination in the time domain. For the IUC response message, the MAC-CE signaling techniques may be used to signal N>2 (non-)preferred resource combinations. For N<2 (non-)preferred resource combination, MAC-CE and additionally SCI 2 signaling may be used for the IUC response message.

In the SCI 2 signaling example, the IUC response message (also referred to simply as IUC information) carried in an SCI message format 2-C may include the same fields as the SCI message format 2-A, with the exception of the cast type indicator. The SCI 2 may be used in addition to MAC-CE signaling when the cast type for the IUC response message is a unicast cast type, in some examples. When both SCI 2 and MAC-CE signaling are used as containers for the IUC information, a slot offset of up to 255 may be supported.

In the SCI 2 IUC response message examples, the IUC response message may also include bit(s) indicating whether the IUC response message is providing an indication of the (non-)preferred resources or requesting an indication of the (non-) preferred resources. The SCI 2 IUC response message may also indicate the resource combination(s). For example, the SCI 2 IUC response message may indicate:

$$2 * \left\{ \left\lceil \log_s \left( \frac{N_{subchannel}^{SL}(N_{subchannel}^{SL} + 1)(2N_{subchannel}^{SL} + 1)}{6} \right) \right\rceil + 9 + Y \right\},$$

where $N_{subchannel}^{SL}$ is provided by the higher layer parameter sl-NumSubchannel. $Y = \lceil \log_s N_{rsv\_period} \rceil$ is the number of entries in the higher layer parameter sl-ResourceReservePeriodList, if the higher layer parameter sl-MultiReserveResource is configured. Otherwise, Y=0.

The IUC response message may include a first resource location field and a reference slot location field. The first resource location (e.g., in the time domain) may use bit(s) to signal the starting slot (e.g., the reference slot). The reference slot location may indicate $(10+\lceil \log_2(10*2^u) \rceil)$, where u is 0, 1, 2, or 3, for SCS of 15 kHz, 30 kHz, 60 kHz, or 120 kHz, respectively. The IUC request message may include a resource set type that uses bit(s) to indicate whether the IUC request is for preferred resources or for non-preferred resources (e.g., when the parameter determineResourceSetTypeScheme1 is set to "UE-B's request." Otherwise, no bits may be allocated to the resource set type field. The IUC response message may include a lowest subchannel indices for the first resource location of each TRIV. For example, the field may indicate $2*\lceil \log_2(N_{subchannel}^{SL}) \rceil$, where $N_{subchannel}^{SL}$ is provided by the higher layer parameter sl-NumSubChannel. In some examples, the lowest subchannel index for the first resource location of each TRIV may be separately indicated in the IUC response message. In some examples, the IUC response message may include an actual number of resource combinations field. In the IUC response message, the field size of the indication of the resource combination(s) using the SCI 2 format may be determined based on N=2. The indication of $$\frac{N_{subchannel}^{SL}(N_{subchannel}^{SL} + 1)(2N_{subchannel}^{SL} + 1)}{6}$$

may be for a FRIV, the indication of "9" or some other value may be for a TRIV, and the indication of Y may be for the RRI. The indication of the first resource location of each TRIV may be an indication of a slot offset with respect to a reference slot.

In the MAC-CE signaling example, the IUC response message carried in the MAC-CE may include similar fields to the SCI 2 format. However, the number of resources being indicated using the MAC-CE signaling may be more than 2 (e.g., N does not have to equal 2). The MAC-CE IUC response message may include the providing/requesting indicator field. The MAC-CE IUC response message may indicate the resource combination field. For example, the resource combination field may indicate $$N * \left\{ \left\lceil \log_s \left( \frac{N_{subchannel}^{SL}(N_{subchannel}^{SL} + 1)(2N_{subchannel}^{SL} + 1)}{6} \right) \right\rceil + 9 + Y \right\},$$

where $N_{subchannel}^{SL}$ is provided by the higher layer parameter sl-NumSubchannel. $Y = \lceil \log_s N_{rsv\_period} \rceil$ is the number of entries in the higher layer parameter sl-ResourceReservePeriodList, if the higher layer parameter sl-MultiReserveResource is configured. Otherwise, Y=0.

The MAC-CE IUC response message may include a first resource location field and a reference slot location field. The first resource location (e.g., in the time domain) may use bit(s) to (N−1) $\lceil \log_2 X \rceil$, where X is provided by the (pre)configured maximum value of slot offset for the case when MAC-CE only is used as the container for the IUC response message. The reference slot location may indicate $(10+\lceil \log_2(10*2^u) \rceil)$, where u is 0, 1, 2, or 3, for SCS of 15 kHz, 30 kHz, 60 kHz, or 120 kHz, respectively. The MAC-CE IUC request message may include a resource set type that uses bit(s) to indicate whether the IUC request is for preferred resources or for non-preferred resources. The MAC-CE IUC response message may include a lowest subchannel indices for the first resource location of each TRIV. For example, the field may indicate $N*\lceil \log_2(N_{subchannel}^{SL}) \rceil$, where $N_{subchannel}^{SL}$ is provided by the higher layer parameter sl-NumSubChannel. In some examples, the maximum value of N resource combinations being conveyed in the IUC information may be bounded so that the total payload size of IUC response message does not result in an excessive size of the transport block (TB) carrying the MAC-CE. For a slot offset that is (pre)configured to indicate the first resource location of each TRIV with respect to a reference slot, the granularity of the slot offset may be 1 logical slot, the (pre)configured maximum value of the slot offset may be up to 8000, and when both SCI 2 and MAC-CE are used as the container for the IUC response, the maximum value of the slot offset may be 255. When MAC-CE is used as the only container carrying the IUC information, the maximum value of the slot offset may be the (pre)configured maximum value.

In some examples, an SCI may be used to schedule multiple transmission time interval (TTI) (e.g., an SCI may be used to schedule multiple physical sidelink control channel (PSCCH) and/or physical sidelink shared channel (PSSCH) transmissions to conserve control signaling. For example, an embedded SCI in PSSCH (Alternative 1) and a decoupled SCI pool (Alternative 2) may be considered. Alternative 2 may be preferred for frequency range two (FR2) as one SCI can include quasi-colocation (QCL) information in the SCI and allow the receiver to apply appropriate QCL for PSSCH decoding. An SCI 1 may reserve up to 2 future bursts of slots for a multi-TB retransmission. A new time resource allocation field (K0 and the # of contiguous slots) may be applied. The number of contiguous slots for retransmission could be the same as used in the first transmission, or may be separately RRC configured. The time domain resource allocation (TDRA) or frequency domain resource allocation (FDRA) indications may reserve future slot/mini-slot bursts for PSSCH retransmission. Additionally, the TDRA or FDRA fields may reserve control mini-slots for future re-scheduling SCIs for decouple the control pool. Additionally, the SCI 1 may contain common FDRA and MCS fields for all of the PSSCH slots, a beta offset for the SCI 2, and a reserved transmit beam index and transmitters identifier if beam reservation is supported. The SCI 2 scheduling burst communications generally carries a HARQ identifier and service area identifier (SAI) for the first scheduled PSSCH slot and the values are virtual for the following PSSCH slots. A single K1 and PRI for the HARQ feedback, a source/destination identifier, a new data indicator (NDI) and redundancy version (RV) for each scheduled PSSCH slot, and a transmission configuration indicator (TCI) state for all of the schedules PSSCH slots (Alt 2) may be indicated in the SCI 2 scheduling multiple TBs.

In some examples, the communications may be performed over an unlicensed or shared radio frequency band. In unlicensed cellular communications, PUSCH resource allocations for NR-U may use an (X,Y) to indicate the resource allocation. X may indicate which interlaces are being allocated and Y may indicate which RB sets are being allocated. For the X indication in a 30 kHz SCS case, arbitrary interlace combinations may be supported using a five-bit bitmap. For the 15 kHz SCS case, consecutive interlace allocations may be supported, with some (regular) sets of interlace allocation being supported with MV. For the Y indication, consecutive RBs are supported for allocation. For a standalone SL-U deployment, the SL nodes may not use the same point A (e.g., frequency grid) and the absolute interlace index definition could be different. In some examples, the FDRA may be used in the form of a relative allocation starting from the current subchannel where the FDRA indicates how many subchannel(s) is allocated.

However, such techniques limit utilization of the IUC procedures. For example, a transmitter may prefer to clear the listen-before-talk (LBT) procedure and transmit in certain RB set(s) as there is less interference in a 20 MHz channel (e.g., WiFi interference) and the receiving node may not know the interference around transmitter. Accordingly, the transmitter may want to send the recommended RB set to assist the receiver to pick the preferred resources. However, conventional techniques only support the IUC information (e.g., carried in the IUC request message and/or in the IUC response message) only can signal up to N TRIV's (N up to 3) with (N−1) first resource locations which indicates the offset from the reference slot to the first resource indicated in the TRIV. The first TRIV is with respect to the reference slot, and the second or third TRIV is with respect to the indicated first resource locations (which is with respect to the reference slot). Each TRIV could signal up to three slots within the 32 slots from the reference point. For sidelink-U operations, the sidelink nodes may choose or reserve multiple contiguous slots to deal with LBT uncertainty or bursty traffic, and the TRIV, FRIV, or both, signaling according to such conventional techniques do not support such resource signaling in IUC exchanges. As one example for the FRIV indicated in the IUC information, the signaling needs to indicate RB-set and interlace information, such as to support sidelink-U.

Accordingly, aspects of the techniques discussed herein provide for relative (X, Y) indications in the IUC exchanges (such as for supporting sidelink-U PSSCH). The relative X (bitmap or RIV) with respect to the scheduling SCI 1 interlace may be supported. The X bitmap may indicate which interlaces are allocated, with wrap around (e.g., repetition of the indicated interlaces). The Relative Y may be with respect to the SCI 1 reception RB set (e.g., may indicate the number of occupied RB set starting from the SCI 1 reception RB set). The described improved signaling techniques may be applicable to the IUC request message, to the IUC response message, or to both messages.

For example, UE 210 may transmit or otherwise provide (and UE 205 may receive or otherwise obtain) an IUC request message. In some aspects, the IUC request message may indicate the priority value, number of subchannels, time interval between periodic transmissions, resource selection window, and the like. For example, the IUC request message may include a prior$_{TX}$ field (priority value) indicating the priority of the second UE's intended transmission, a $L_{subCH}$ field (logical number of subchannels) indicating the second UE's intended transmission, and P rsvp Tx field (reservation period of the time interval between the second UE's periodic transmissions) of the second UE's intended transmissions. The starting/ending times of the resource selection window may be based on the packet delay budget (PDB) of the second UE's transmissions. The starting/ending times of resource selection window (RSW) may be a form of a combination of dual frequency network (DFN) index and slot index. If the first UE is the intended receiver, UE 205 may provide the preferred resource based on the modified resource selection or non-preferred resources which have high amount of interference in the IUC response message.

In sidelink unlicensed, the second UE may prefer a certain RB-set (e.g., in a 20 MHz channel) in which it may clear the LBT more easily (e.g., identify a suspected clean channel). Accordingly, the second UE may determine if the first UE is to provide an indication of the preferred set in the preferred RB-set(s) in the IUC response message. The second UE may want the first UE to provide a burst of preferred slots to carry multiple TBs (e.g., for eMBB traffic) or address LBT uncertainty. Accordingly, the second UE may want to recommend the number of slots in the preferred bursts.

Accordingly, in some examples the IUC request message may carry or otherwise convey, in addition to or in lieu of the information discussed above, a requested RB set and interlacing pattern frequency configuration and a starting slot and slot burst length configuration for the multi-slot burst communications between UE 205 and UE 210. For example, the IUC request message requesting the resource scheduling information for the (non-)preferred resources may include an indication of the recommended RB-sets as well as the number of slots in the bursts of preferred slots. The second UE may suggest to the first UE the recommended RB-set(s) in the IUC request message so that the second UE can make resource selection (scheduling decisions) within the recommended RB-set. In the sidelink unlicensed two-part FDRA (X,Y) indication, Y may be used to indicate the starting RB-set and the number of continuous RB-set(s) and X may be used to indicate which interlace(s) are allocated.

Broadly, the requested RB set and interlacing pattern frequency in the IUC request message may include an indication of the starting RB set and an indication of the number of continuous RB set(s) or a bitmap using each bit to indicate the starting RB set and continuous or discontinuous RB set(s). That is, different options may be employed to indicate the recommended RB-set(s) in the IUC request message. One option may include the IUC request message including an indication of the starting RB set and number of continuous RB set(s) (e.g., reusing the Y encoding techniques). Another option may include the IUC request message including a bitmap of the recommended RB set(s). That is, each bit in the bitmap may correspond to a unique RB set and the bits of the bitmap may be set or otherwise configured to indicate whether the corresponding RB set is allocated. This may enable signaling of discontinuous RB sets, as well as the starting RB set (e.g., the RB set having the lowest index) in the IUC request (e.g., the requested RB set and interlacing frequency configuration and requested starting slot and slot burst length configuration). The number of bits included in the bitmap may be based on the number of potential RB set(s) that can be allocated for communications. Again, if the second UE is aware of the number of slots needed (e.g., for eMBB traffic and/or to clear an LBT procedure), the IUC request message can signal the recommended number of slots in the bursts of preferred slots. The first UE can then make resource selection based on the recommendation and return the preferred burst resources having the desired length in the IUC response message. This may signal the interlacing pattern to be used during the burst resources.

Accordingly, to address LBT uncertainty or burst traffic, the second UE may indicate the burst of slots for the initial transmission and retransmission(s) in the IUC request message, as well as the starting slot and slot burst length (e.g., the number of slots included for the multi-slot burst communications). Accordingly, in some examples the RB set and interlacing pattern frequency configuration indicated in the IUC response message may be based on the requested RB set and interlacing pattern frequency configuration. Similarly, the starting slot and slot burst length configuration indicated in the IUC response message may be based on the requested starting slot and slot burst length indicated in the IUC request message.

UE 205 may respond to the IUC request message by transmitting an IUC response message to UE 210. As discussed, the IUC response message may carry additional information for resources supporting multi-slot burst communications. In some aspects, the resource information indicated in the IUC response message may be based, at least to some degree, on the resource information indicated in the IUC request message. Accordingly, the IUC response message may carry or otherwise convey an indication of the starting slot and slot burst length (e.g., a TRIV identifying the starting slot and number of slots included for multi-slot burst communications). That is, the IUC response message may support identifying resource scheduling information supporting bursts of communications in (non-)preferred slots. In some aspects, this may include using the TRIV for each (non-)preferred resource combination as well as including additional length field(s) to indicate the length of the slot burst after the TRIV indicated slots.

In some examples, the indication of the number of slots included for multi-slot burst communications may include a shared indication of the number of slots that are included in each instance of the multi-slot burst communications. For example, the same slot burst length may be used for each instance of the multi-slot burst communications. This may use a common burst duration field in the IUC response message for the (non-)preferred resources.

In some examples, the indication of the number of slots included for multi-slot burst communications may include a first indication of the number of slots that are included in a first instance of the multi-slot burst communications and a second indication of the number of slots that are included in additional instance(s) of the multi-slot burst communications. For example, a different number of contiguous slots may be signaled in the IUC response message for the (non-)preferred resources. The different burst duration fields may be used for the initial (e.g., first) instance and for the subsequent instance(s) of the multi-slot burst communications.

In some examples, the indication of the number of slots included for multi-slot burst communications may include a separate indication of the number of slots that are included for each instance of the multi-slot burst communications. That is, each TRIV indicated slot may be signaled with its own indication of the number of contiguous slots for each instance of the multi-slot burst communications. In some examples, the field lengths uses for each signaled TRIV indicated slot may be the same or different. That is, one alternative may be to share the common length field(s) among each indicated instance or to use different field lengths for the slot burst(s) (e.g., each instance has its own slot burst length field size).

In some examples, wireless communications system 200 may support overbooking on the reserved channel occupancy time (COT) (e.g., the time in which the channel is reserved after a successful LBT procedure). Accordingly, the IUC exchange may support resource selection and reservation using different starting positions. Even when some resources are reserved, the first UE may want to indicate the preferred resources having a shorter common phase error (CPE) or a later starting position when overlapping with reserved COT resources.

Accordingly, in some examples the IUC response message may indicate an earliest starting slot for the multi-slot burst communications. For example, the IUC response message may carry or otherwise convey an indication of a starting position for the (non-)preferred resources. For example, the first UE (e.g., UE 205) may indicate the earliest start position based on its resource selection. If the first UE identifies a reservation having a certain starting position within the set of starting positions associated with a given priority, then the first UE may pick the later starting position within the set (such as the one right after the reserved starting position). The second UE may select a starting position no earlier than the one indicated in the preferred resource (e.g., in the IUC response message). This may enable the second UE to yield to the first UE which reserves earlier starting position (sensed by the first UE) in the IUC response message.

If the second UE determines that earlier starting positions within the set of starting positions associated with a given priority are not available for a preferred resource, the resource may be overloaded. The second UE may attempt to pick a resource from the preferred resources having less overloading.

Accordingly, the resource combination field in the IUC response message may contain N FRIVs for N (non-)preferred resource sets. To support the frequency resource allocation in terms of RB sets and interlaces (e.g., in sidelink unlicensed), the FRIV fields of the IUC response message may also be enhanced. In some aspects, this may include using the two-part FDRA (X,Y) for the FRIV indication and including the reference RB set and interlace in the IUC response message. The IUC response message may carry or otherwise convey an indication of the starting RB set (e.g., in addition to or instead of the starting subchannel indication) and the starting interlace for the first resource in the FDRA. That is, the IUC response message may carry or otherwise convey an indication of the RB set and interlacing pattern frequency configuration that includes the starting RB set with the number of RB set(s) (e.g., contiguous or non-contiguous) and an interlacing pattern for the starting RB set and number of RB set(s).

For the Y part (RB set), there may be K RB set(s) in the resource pool. In the non-limiting example where continuous RB set(s) are allocated, UE 205 may jointly encode the starting RB set and number of RB set(s) with up to three (N) resources. This may include using $$\left\lceil \log_2 \left( K * \frac{K+1}{2} \right) \right\rceil \text{ bits for } N = 2 \text{ or using } \left\lceil \log_2 \left( \frac{K(K+1)(2K+1)}{6} \right) \right\rceil$$

bits for N=3.

For the X part (interlace), joint encoding of the initial assignment and future reservation offsets are possible (e.g., when indicating continuous slots). For N=Y+1 (Y future reservations), there may be M total interlaces (e.g., if L interlaces are allocated), the IUC response message may indicate signal $(M-L)^Y$ offsets. The FDRA indicated in the IUC response message may contain $$\left\lceil \log_2 \left( M * \frac{M+1}{2} \right) \right\rceil$$

bits for N=2 or using $$\left\lceil \log_2 \left( \frac{M(M+1)(2M+1)}{6} \right) \right\rceil$$

bits for N=3. To use a relative bitmap to indicate non-contiguous interlaces (assuming M total interlaces), assume Y future reservations may take the same interlace pattern but with different relative interlace offsets, then the resulting indication may use an M bit bitmap for the first resource and $\lceil \log 2(M) \rceil$ additional bits for 1 future reservation and $\lceil \log_2 M \rceil$ additional bits for two future reservations.

Accordingly, the IUC request message and IUC response message may carry or otherwise convey an indication of time and/or frequency resources suited for multi-slot burst communications between UE 205 and UE 210.

Figure 3:
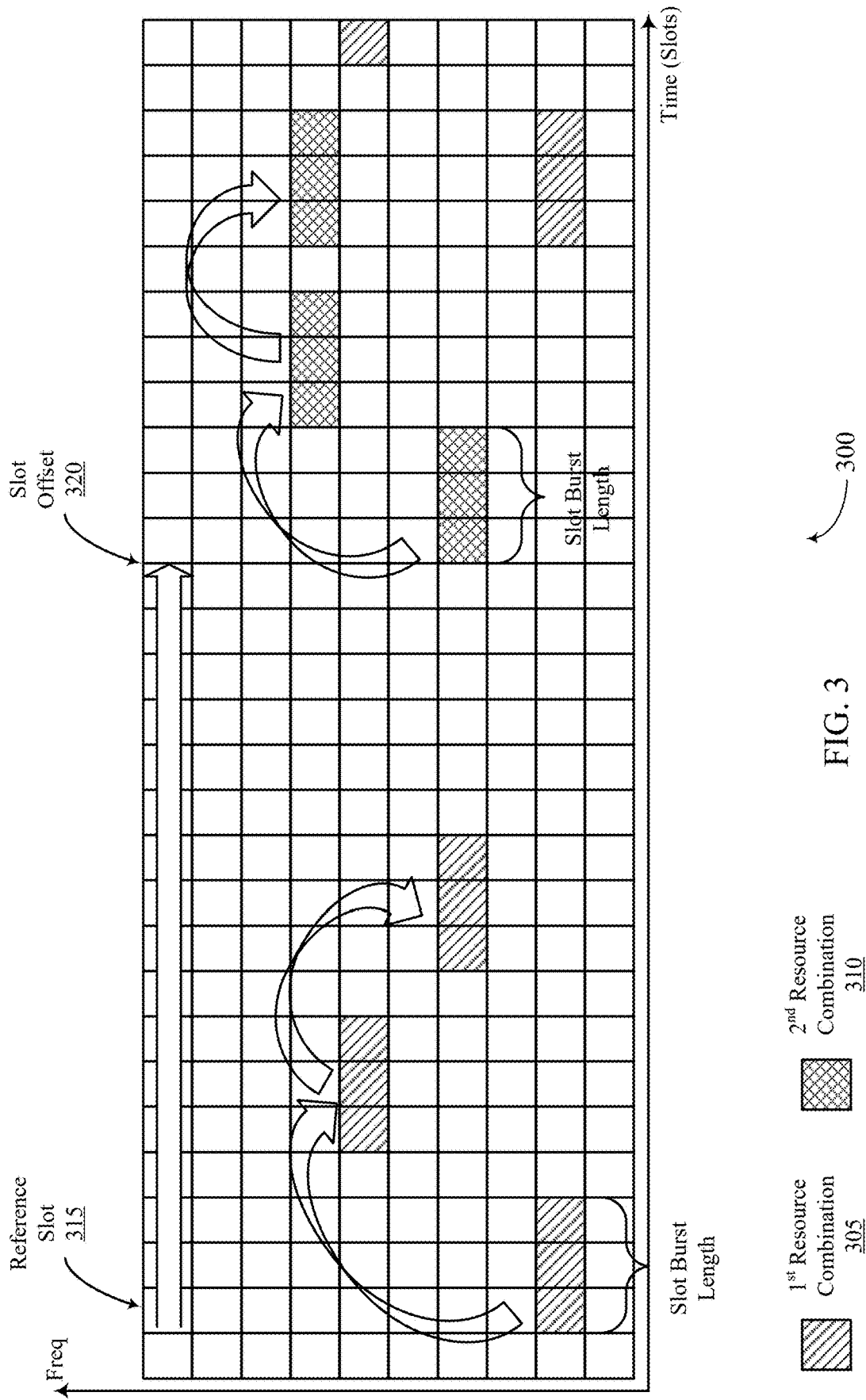
FIG. 3 illustrates an example of a resource configuration that supports inter-UE coordination for sidelink in an unlicensed or shared spectrum in accordance with one or more aspects of the present disclosure.

FIG. 3 illustrates an example of a resource configuration 300 that supports IUC for sidelink in an unlicensed or shared spectrum in accordance with one or more aspects of the present disclosure. Resource configuration 300 may implement aspects of wireless communications systems 100 and/or 200. Aspects of resource configuration 300 may be implemented at or by a UE, which may an example of the corresponding device described herein.

As discussed above, aspects of the techniques described herein provide for improved IUC exchanges between UE. The improvements generally support the IUC request message, the IUC response message, or both, indicating frequency and time resources at the RB set level, identifying timing (e.g., offset, delay, repetition) parameters for multi-slot burst communications between the UE, and the like. Resource configuration 300 illustrates a non-limiting example of the resources configured (e.g., indicated in the IUC request or response messages, or resources scheduled in response to the IUC messages.

For example, a first UE may transmit or otherwise provide a IUC response message to a second UE. The IUC response message may be triggered by the occurrence of an event or condition or may be triggered by an IUC request message received from the second UE. The IUC response message may carry or otherwise convey scheduling information. The scheduling information may include an RB set and interlacing pattern frequency, a starting slot and slot burst length, or both, for the multi-slot burst communications. In some examples, the IUC request message may indicate a requested RB set and interlacing pattern frequency configuration, a requested starting slot and slot burst length, or both, for the multi-slot burst communications.

Resource configuration 300 illustrates an example of resource scheduling for multi-slot burst communications that may be signaled or otherwise based on the IUC message exchange. For example, the IUC response message may indicate a first resource combination 305 and a second resource combination 310. Each resource combination may identify a set of slots, starting at reference slot 315, that may be used for a first set of multi-slot burst communications using the first resource combination 305. The first set of slots, beginning at reference slot 315, may include three slots, by way of example only, that may be scheduled by a first TRIV and FRIV indication. For example, the first TRIV indicated in the IUC response message may identify the first three slots (the slot burst length is three slots) as the first instance of multi-slot burst communications. The first three slots may be signaled in the IUC response message using the improved TRIV indications discussed above (e.g., starting slot and slot burst length in the time domain, or both), the improved FRIV indications discussed above (e.g., starting RB and number of RB set(s) in the frequency domain, such as using the (X,Y) indication features), or both. The X portion of the FRIV indication may be used to indicate the interlace for the resource combination (e.g., the interlace pattern frequency configuration).

The second resource combination 310 may be indicated relative to reference slot 315 using a slot offset 320. Like first resource combination 305, the second resource combination 310 may be indicated using a second TRIV or FRIV field in the IUC response message. The second TRIV or FRIV field may be an absolute TRIV or FRIV indication may be signaled relative to first resource combination 305 (e.g., relative to reference slot 315).

Figure 4:
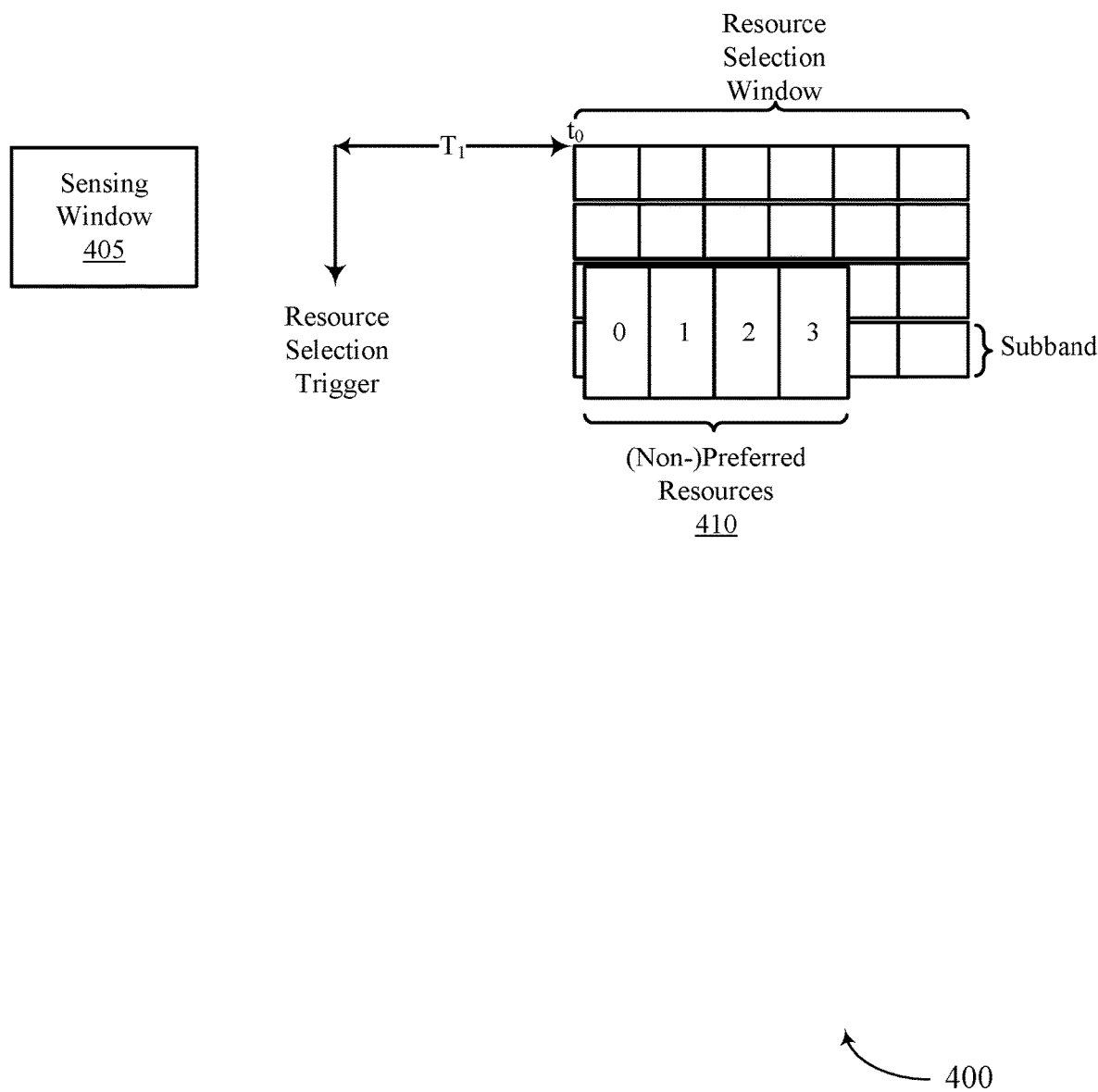
FIG. 4 illustrates an example of a resource configuration that supports inter-UE coordination for sidelink in an unlicensed or shared spectrum in accordance with one or more aspects of the present disclosure.

FIG. 4 illustrates an example of a resource configuration 400 that supports IUC for sidelink in an unlicensed or shared spectrum in accordance with one or more aspects of the present disclosure. Resource configuration 400 may implement aspects of wireless communications systems 100 and/or 200, or aspects of resource configuration 300. Aspects of resource configuration 400 may be implemented at or by a UE, which may an example of the corresponding device described herein.

As discussed above, aspects of the techniques described herein provide for improved IUC exchanges between UE. The improvements generally support the IUC request message, the IUC response message, or both, indicating frequency and time resources at the RB set level, identifying timing (e.g., offset, delay, repetition, or interlace) parameters for multi-slot burst communications between the UE, and the like.

For example, a first UE may transmit or otherwise provide a IUC response message to a second UE. The IUC response message may be triggered by the occurrence of an event or condition or may be triggered by an IUC request message received from the second UE. The IUC response message may carry or otherwise convey scheduling information. The scheduling information may include an RB set and interlacing pattern frequency, a starting slot and slot burst length, or both, for the multi-slot burst communications. In some examples, the IUC request message may indicate a requested RB set and interlacing pattern frequency configuration, a requested starting slot and slot burst length, or both, for the multi-slot burst communications.

Resource configuration 400 illustrates an example of resource scheduling for multi-slot burst communications that may be signaled or otherwise based on the IUC message exchange. For example, the IUC response message may indicate resources with a shorter CPR or later starting position when overlapping with reserved COT resources. Resource configuration 400 illustrates an example where the indication of the TRIV indicates an earliest starting slot for the multi-slot burst communications.

For example, a sensing window 405 may be defined during which the UE may monitor for one or more channels for channel measurement and performance procedures. Accordingly, during sensing window 405 the UE may identify or otherwise determine which channels are best suited for communications. After a resource selection has been triggered, the UE may have a time period $T_1$ during which the UE selects the resources to be used from a resource selection window. The UE may select a resource having a starting position at $T_1 > T_0$. Accordingly, the IUC response message may indicate the earliest starting slot, which may improve resource selection of (non-) preferred resources 410 by the UE.

Figure 5:
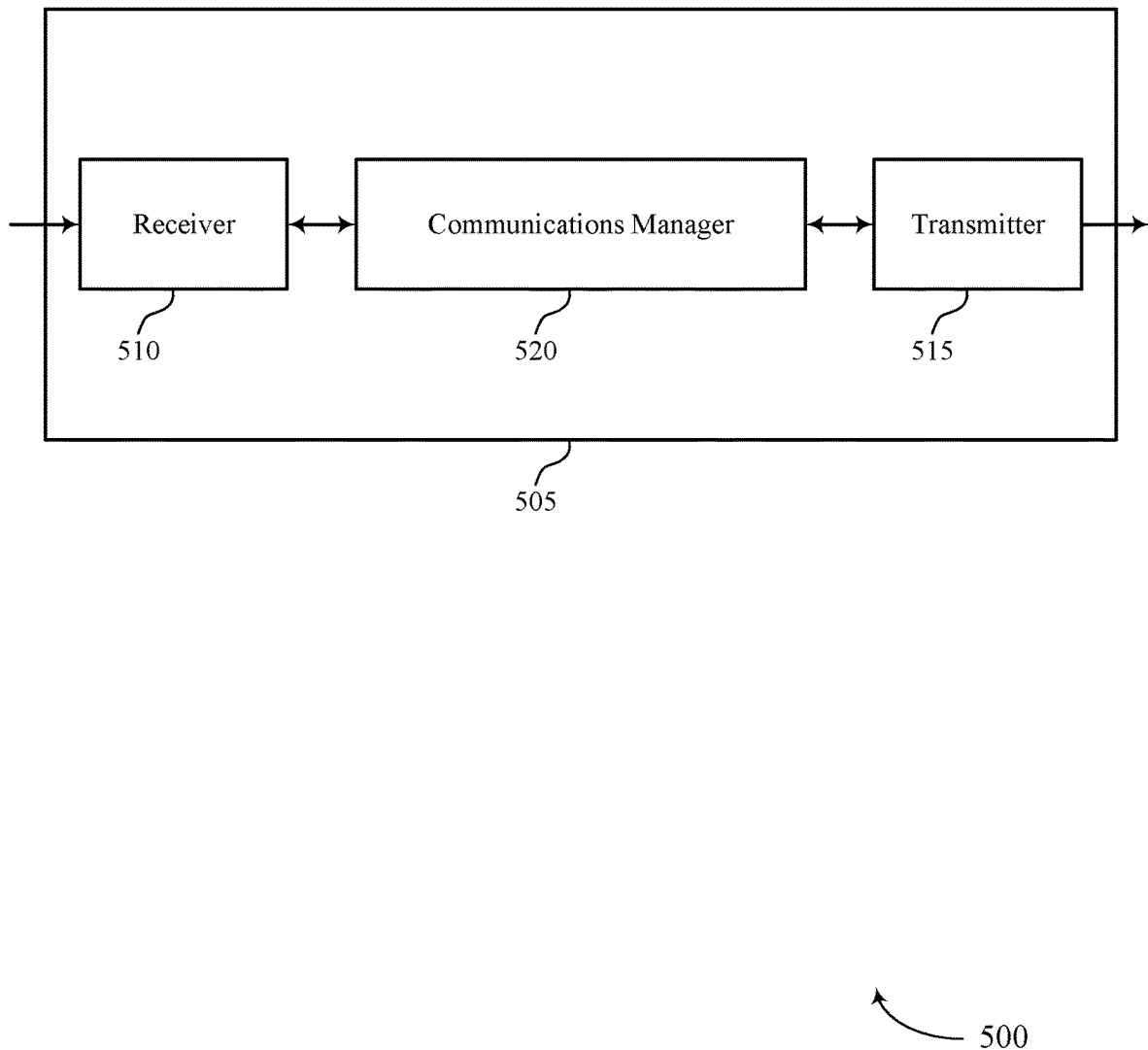
FIGS. 5 and 6 show block diagrams of devices that support inter-UE coordination for sidelink in an unlicensed or shared spectrum in accordance with one or more aspects of the present disclosure.

FIG. 5 shows a block diagram 500 of a device 505 that supports IUC for sidelink in an unlicensed or shared spectrum in accordance with one or more aspects of the present disclosure. The device 505 may be an example of aspects of a UE 115 as described herein. The device 505 may include a receiver 510, a transmitter 515, and a communications manager 520. The device 505 may also include a processor. Each of these components may be in communication with one another (e.g., via one or more buses).

The receiver 510 may provide a means for receiving information such as packets, user data, control information, or any combination thereof associated with various information channels (e.g., control channels, data channels, information channels related to IUC for sidelink in an unlicensed or shared spectrum). Information may be passed on to other components of the device 505. The receiver 510 may utilize a single antenna or a set of multiple antennas.

The transmitter 515 may provide a means for transmitting signals generated by other components of the device 505. For example, the transmitter 515 may transmit information such as packets, user data, control information, or any combination thereof associated with various information channels (e.g., control channels, data channels, information channels related to IUC for sidelink in an unlicensed or shared spectrum). In some examples, the transmitter 515 may be co-located with a receiver 510 in a transceiver module. The transmitter 515 may utilize a single antenna or a set of multiple antennas.

The communications manager 520, the receiver 510, the transmitter 515, or various combinations thereof or various components thereof may be examples of means for performing various aspects of IUC for sidelink in an unlicensed or shared spectrum as described herein. For example, the communications manager 520, the receiver 510, the transmitter 515, or various combinations or components thereof may support a method for performing one or more of the functions described herein.

In some examples, the communications manager 520, the receiver 510, the transmitter 515, or various combinations or components thereof may be implemented in hardware (e.g., in communications management circuitry). The hardware may include a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally, or alternatively, in some examples, the communications manager 520, the receiver 510, the transmitter 515, or various combinations or components thereof may be implemented in code (e.g., as communications management software or firmware) executed by a processor. If implemented in code executed by a processor, the functions of the communications manager 520, the receiver 510, the transmitter 515, or various combinations or components thereof may be performed by a general-purpose processor, a DSP, a CPU, an ASIC, an FPGA, a microcontroller, or any combination of these or other programmable logic devices (e.g., configured as or otherwise supporting a means for performing the functions described in the present disclosure).

In some examples, the communications manager 520 may be configured to perform various operations (e.g., receiving, obtaining, monitoring, outputting, transmitting) using or otherwise in cooperation with the receiver 510, the transmitter 515, or both. For example, the communications manager 520 may receive information from the receiver 510, send information to the transmitter 515, or be integrated in combination with the receiver 510, the transmitter 515, or both to obtain information, output information, or perform various other operations as described herein.

The communications manager 520 may support wireless communication at a first UE in accordance with examples as disclosed herein. For example, the communications manager 520 may be configured as or otherwise support a means for receiving an IUC request message from a second UE, the IUC request message identifying a request for resource scheduling information for the first UE, the second UE, or both. The communications manager 520 may be configured as or otherwise support a means for transmitting an IUC response message including the scheduling information to the second UE, the scheduling information including an indication of one or more of a resource block set and interlacing pattern frequency configuration for multi-slot burst communications between the first UE and the second UE or a starting slot and slot burst length configuration for the multi-slot burst communications between the first UE and the second UE.

Additionally, or alternatively, the communications manager 520 may support wireless communication at a second UE in accordance with examples as disclosed herein. For example, the communications manager 520 may be configured as or otherwise support a means for transmitting an IUC request message from a first UE, the IUC request message identifying a request for resource scheduling information for the first UE, the second UE, or both. The communications manager 520 may be configured as or otherwise support a means for receiving an IUC response message including the scheduling information from the first UE, the scheduling information including an indication of one or more of a resource block set and interlacing pattern frequency configuration for multi-slot burst communications between the first UE and the second UE or a starting slot and slot burst length configuration for the multi-slot burst communications between the first UE and the second UE.

By including or configuring the communications manager 520 in accordance with examples as described herein, the device 505 (e.g., a processor controlling or otherwise coupled with the receiver 510, the transmitter 515, the communications manager 520, or a combination thereof) may support techniques for improved IUC message content to support RB level resource signaling, starting slot and slot burst length indications, and other improvements to schedule multi-slot burst communications.

Figure 6:
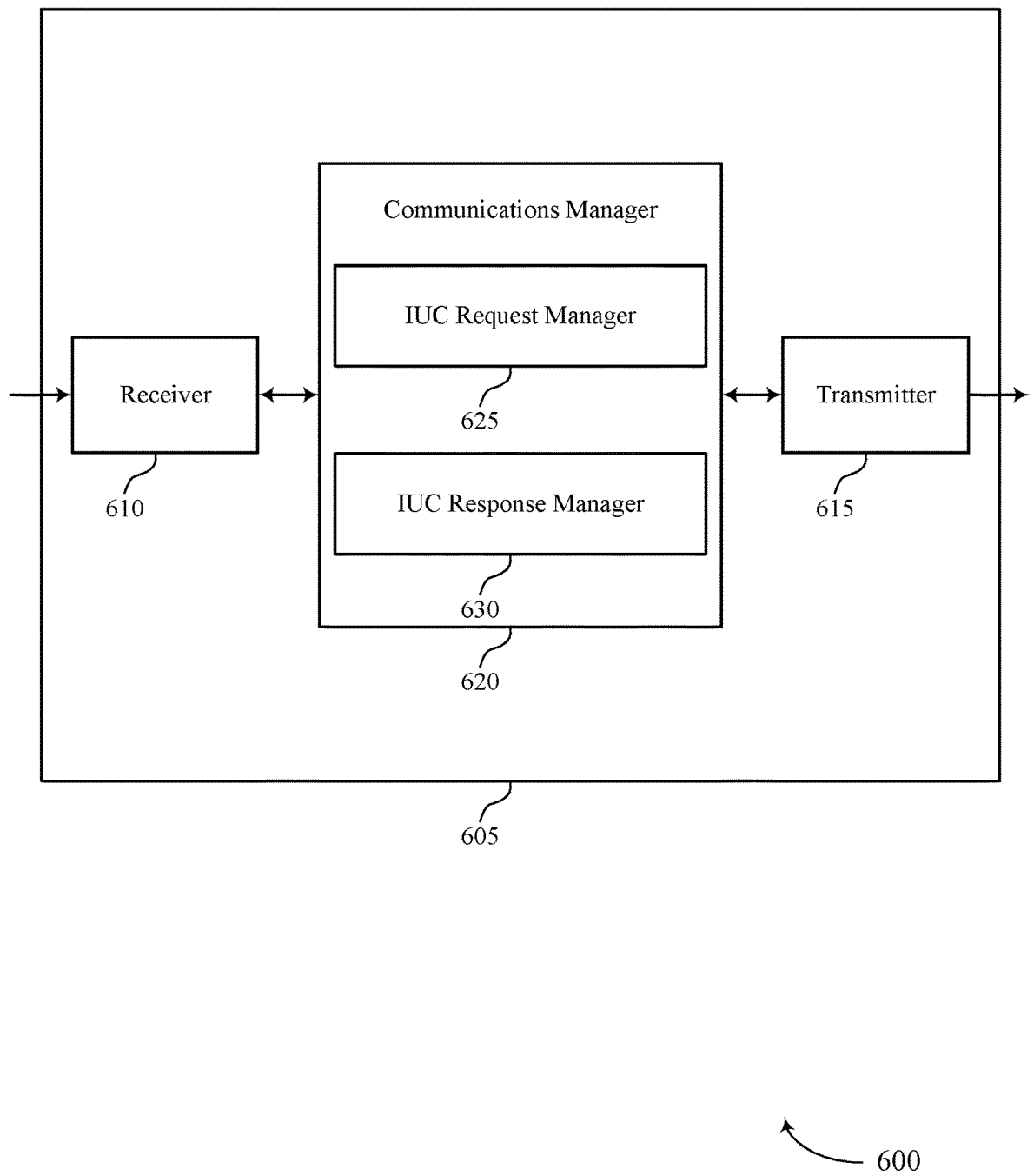

FIG. 6 shows a block diagram 600 of a device 605 that supports IUC for sidelink in an unlicensed or shared spectrum in accordance with one or more aspects of the present disclosure. The device 605 may be an example of aspects of a device 505 or a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to IUC for sidelink in an unlicensed or shared spectrum). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to IUC for sidelink in an unlicensed or shared spectrum). In some examples, the transmitter 615 may be co-located with a receiver 610 in a transceiver module. The transmitter 615 may utilize a single antenna or a set of multiple antennas.

The device 605, or various components thereof, may be an example of means for performing various aspects of IUC for sidelink in an unlicensed or shared spectrum as described herein. For example, the communications manager 620 may include an IUC request manager 625 an IUC response manager 630, or any combination thereof. The communications manager 620 may be an example of aspects of a communications manager 520 as described herein. In some examples, the communications manager 620, or various components thereof, may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

The communications manager 620 may support wireless communication at a first UE in accordance with examples as disclosed herein. The IUC request manager 625 may be configured as or otherwise support a means for receiving an IUC request message from a second UE, the IUC request message identifying a request for resource scheduling information for the first UE, the second UE, or both. The IUC response manager 630 may be configured as or otherwise support a means for transmitting an IUC response message including the scheduling information to the second UE, the scheduling information including an indication of one or more of a resource block set and interlacing pattern frequency configuration for multi-slot burst communications between the first UE and the second UE or a starting slot and slot burst length configuration for the multi-slot burst communications between the first UE and the second UE.

Additionally, or alternatively, the communications manager 620 may support wireless communication at a second UE in accordance with examples as disclosed herein. The IUC request manager 625 may be configured as or otherwise support a means for transmitting an IUC request message from a first UE, the IUC request message identifying a request for resource scheduling information for the first UE, the second UE, or both. The IUC response manager 630 may be configured as or otherwise support a means for receiving an IUC response message including the scheduling information from the first UE, the scheduling information including an indication of one or more of a resource block set and interlacing pattern frequency configuration for multi-slot burst communications between the first UE and the second UE or a starting slot and slot burst length configuration for the multi-slot burst communications between the first UE and the second UE.

Figure 7:
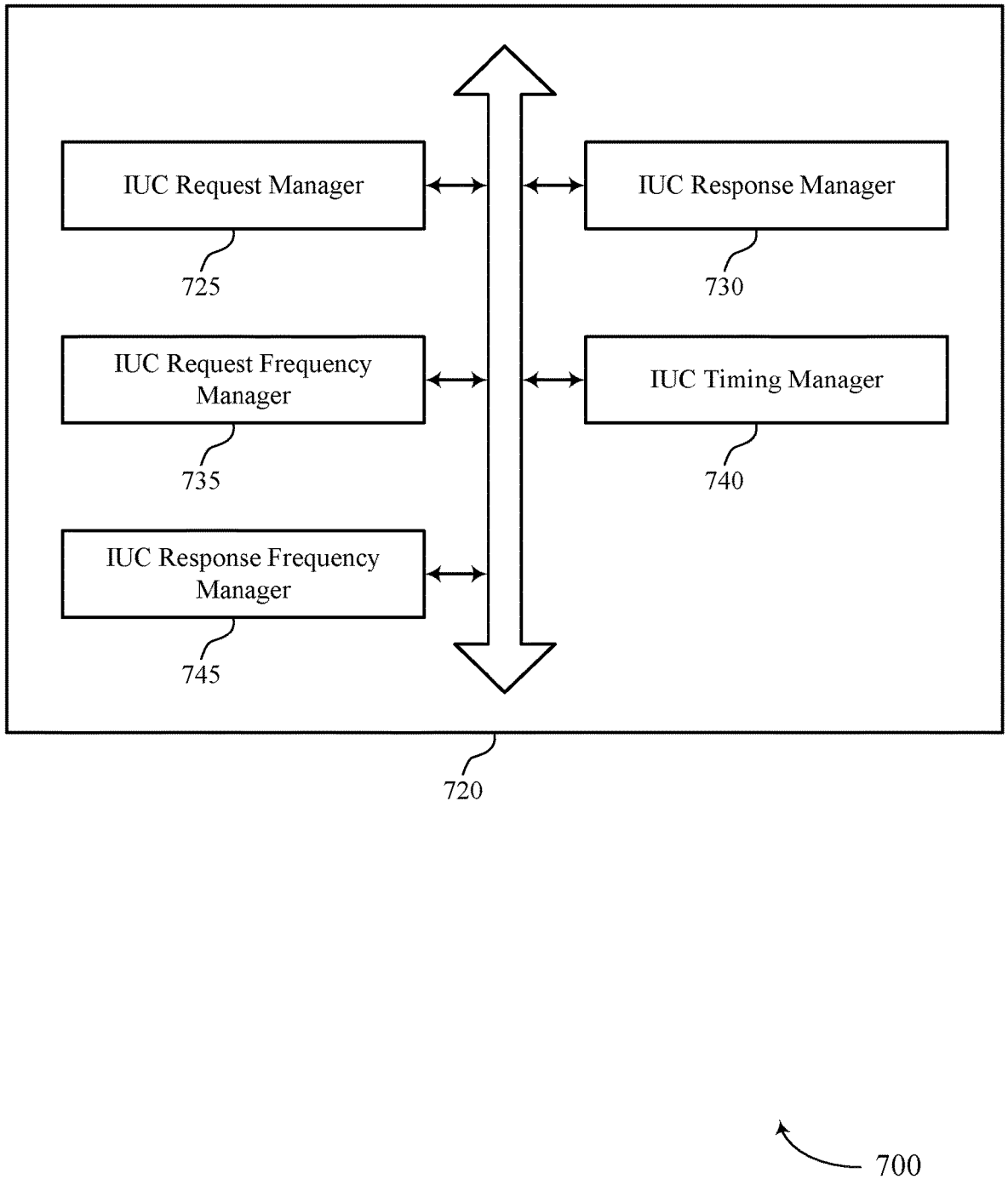
FIG. 7 shows a block diagram of a communications manager that supports inter-UE coordination for sidelink in an unlicensed or shared spectrum in accordance with one or more aspects of the present disclosure.

FIG. 7 shows a block diagram 700 of a communications manager 720 that supports IUC for sidelink in an unlicensed or shared spectrum in accordance with one or more aspects of the present disclosure. The communications manager 720 may be an example of aspects of a communications manager 520, a communications manager 620, or both, as described herein. The communications manager 720, or various components thereof, may be an example of means for performing various aspects of IUC for sidelink in an unlicensed or shared spectrum as described herein. For example, the communications manager 720 may include an IUC request manager 725, an IUC response manager 730, an IUC request frequency manager 735, an IUC timing manager 740, an IUC response frequency manager 745, or any combination thereof. Each of these components may communicate, directly or indirectly, with one another (e.g., via one or more buses).

The communications manager 720 may support wireless communication at a first UE in accordance with examples as disclosed herein. The IUC request manager 725 may be configured as or otherwise support a means for receiving an IUC request message from a second UE, the IUC request message identifying a request for resource scheduling information for the first UE, the second UE, or both. The IUC response manager 730 may be configured as or otherwise support a means for transmitting an IUC response message including the scheduling information to the second UE, the scheduling information including an indication of one or more of a resource block set and interlacing pattern frequency configuration for multi-slot burst communications between the first UE and the second UE or a starting slot and slot burst length configuration for the multi-slot burst communications between the first UE and the second UE.

In some examples, the IUC request frequency manager 735 may be configured as or otherwise support a means for identifying, based on the IUC request message, a first resource block set and interlacing pattern frequency configuration and a first starting slot and slot burst length configuration for the multi-slot burst communications between the first UE and the second UE, where the indicated resource block set and interlacing pattern frequency configuration is based on the first resource block set and interlacing pattern frequency configuration and the indicated starting slot and the slot burst length configuration is based on the first starting slot and slot burst length configuration.

In some examples, the first resource block set and interlacing pattern frequency configuration include a field indicating the starting resource block set and number of continuous resource block sets or a bitmap where each bit in the bitmap is configured to indicate the starting resource block set and continuous or discontinuous resource block sets. In some examples, the first resource block set and interlacing pattern frequency configuration includes a starting resource block set with a number of continuous or discontinuous resource block sets and an interlacing pattern for the starting resource block set and continuous or discontinuous resource block sets. In some examples, the first starting slot and slot burst length configuration includes a timing resource indication value identifying the starting slot and a number of slots included for multi-slot burst communications between the first UE and the second UE.

In some examples, to support transmitting the IUC response message, the IUC timing manager 740 may be configured as or otherwise support a means for transmitting, in the IUC response message, the indication of the starting slot and slot burst length configuration that includes a timing resource indication value identifying the starting slot and a number of slots included for multi-slot burst communications between the first UE and the second UE.

In some examples, the indication of the number of slots included for multi-slot burst communications includes a shared indication of the number of slots that are included in each instance of the multi-slot burst communications, a first indication of the number of slots that are included in a first instance of the multi-slot burst communications and a second indication of the number of slots that are included in one or more additional instances of the multi-slot burst communications, or a separate indication of the number of slots that are included for each instance of the multi-slot burst communications. In some examples, the indication of the number of slots included for the multi-slot burst communication includes one or more fields indicating the number of slots included for the multi-slot burst communications, where each field of the one or more fields has a shared field length or a different field length. In some examples, the indication of the timing resource indication value includes an earliest starting slot for the multi-slot burst communications.

In some examples, to support transmitting the IUC response message, the IUC response frequency manager 745 may be configured as or otherwise support a means for transmitting, in the IUC response message, the indication of the resource block set and interlacing pattern frequency configuration that includes a starting resource block set with a number of continuous or discontinuous resource block sets and an interlacing pattern for the starting resource block set and continuous or discontinuous resource block sets.

In some examples, the indication of the interlacing pattern includes an interlacing pattern for a starting interlacing pattern for a first instance of the multi-slot burst communications and a shared offset value identifying the offset between each instance of the multi-slot burst communications. In some examples, the indication of the interlacing pattern includes a bitmap where each bit in the bitmap is configured to identify a starting interlacing pattern for a first instance of the multi-slot burst communications and a separate offset value for each subsequent instance of the multi-slot burst communications identifying the offset between each instance.

Additionally, or alternatively, the communications manager 720 may support wireless communication at a second UE in accordance with examples as disclosed herein. In some examples, the IUC request manager 725 may be configured as or otherwise support a means for transmitting an IUC request message from a first UE, the IUC request message identifying a request for resource scheduling information for the first UE, the second UE, or both. In some examples, the IUC response manager 730 may be configured as or otherwise support a means for receiving an IUC response message including the scheduling information from the first UE, the scheduling information including an indication of one or more of a resource block set and interlacing pattern frequency configuration for multi-slot burst communications between the first UE and the second UE or a starting slot and slot burst length configuration for the multi-slot burst communications between the first UE and the second UE.

In some examples, the IUC request frequency manager 735 may be configured as or otherwise support a means for identifying, based on the IUC request message, a first resource block set and interlacing pattern frequency configuration and a first starting slot and slot burst length configuration for the multi-slot burst communications between the first UE and the second UE, where the indicated resource block set and interlacing pattern frequency configuration is based on the first resource block set and interlacing pattern frequency configuration and the indicated starting slot and the slot burst length configuration is based on the first starting slot and slot burst length configuration.

In some examples, the first resource block set and interlacing pattern frequency configuration include a field indicating the starting resource block set and number of continuous resource block sets or a bitmap where each bit in the bitmap is configured to indicate the starting resource block set and continuous or discontinuous resource block sets. In some examples, the first resource block set and interlacing pattern frequency configuration includes a starting resource block set with a number of continuous or discontinuous resource block sets and an interlacing pattern for the starting resource block set and continuous or discontinuous resource block sets. In some examples, the first starting slot and slot burst length configuration includes a timing resource indication value identifying the starting slot and a number of slots included for multi-slot burst communications between the first UE and the second UE.

In some examples, the IUC timing manager 740 may be configured as or otherwise support a means for identifying, based on the IUC response message, the indication of the starting slot and slot burst length configuration that includes a timing resource indication value identifying the starting slot and a number of slots included for multi-slot burst communications between the first UE and the second UE.

In some examples, the indication of the number of slots included for multi-slot burst communications includes a shared indication of the number of slots that are included in each instance of the multi-slot burst communications, a first indication of the number of slots that are included in a first instance of the multi-slot burst communications and a second indication of the number of slots that are included in one or more additional instances of the multi-slot burst communications, or a separate indication of the number of slots that are included for each instance of the multi-slot burst communications.

In some examples, the indication of the number of slots included for the multi-slot burst communication includes one or more fields indicating the number of slots included for the multi-slot burst communications, where each field of the one or more fields has a shared field length or a different field length. In some examples, the indication of the timing resource indication value includes an earliest starting slot for the multi-slot burst communications.

In some examples, the IUC response frequency manager 745 may be configured as or otherwise support a means for identifying, based at least in part on the IUC response message, the indication of the resource block set and interlacing pattern frequency configuration that includes a starting resource block set with a number of continuous or discontinuous resource block sets and an interlacing pattern for the starting resource block set and continuous or discontinuous resource block sets.

In some examples, the indication of the interlacing pattern includes an interlacing pattern for a starting interlacing pattern for a first instance of the multi-slot burst communications and a shared offset value identifying the offset between each instance of the multi-slot burst communications. In some examples, the indication of the interlacing pattern includes a bitmap where each bit in the bitmap is configured to identify a starting interlacing pattern for a first instance of the multi-slot burst communications and a separate offset value for each subsequent instance of the multi-slot burst communications identifying the offset between each instance.

Figure 8:
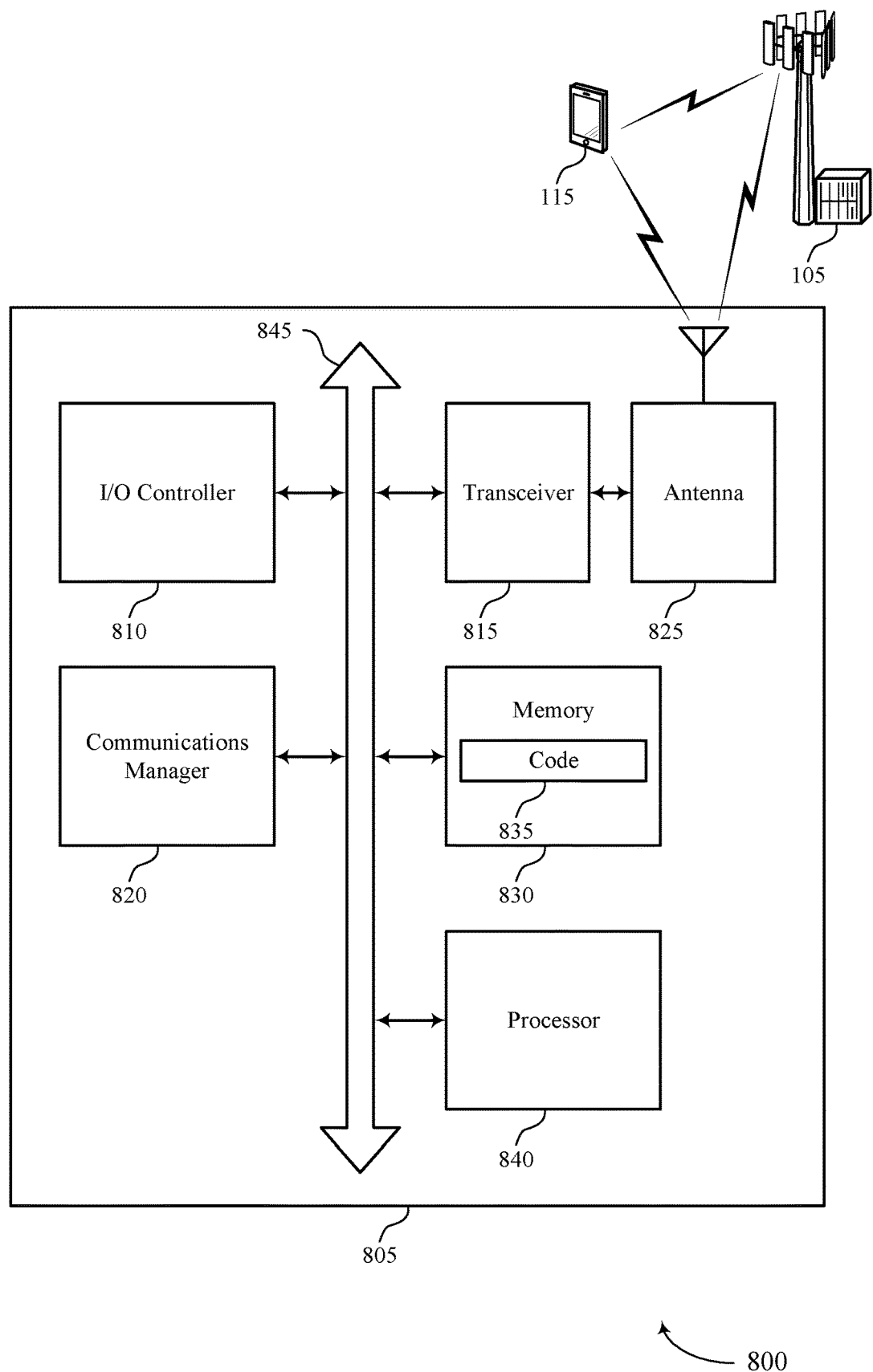
FIG. 8 shows a diagram of a system including a device that supports inter-UE coordination for sidelink in an unlicensed or shared spectrum in accordance with one or more aspects of the present disclosure.

FIG. 8 shows a diagram of a system 800 including a device 805 that supports IUC for sidelink in an unlicensed or shared spectrum in accordance with one or more aspects of the present disclosure. The device 805 may be an example of or include the components of a device 505, a device 605, or a UE 115 as described herein. The device 805 may communicate (e.g., wirelessly) with one or more network entities 105, one or more UEs 115, or any combination thereof. The device 805 may include components for bi-directional voice and data communications including components for transmitting and receiving communications, such as a communications manager 820, an input/output (I/O) controller 810, a transceiver 815, an antenna 825, a memory 830, code 835, and a processor 840. These components may be in electronic communication or otherwise coupled (e.g., operatively, communicatively, functionally, electronically, electrically) via one or more buses (e.g., a bus 845).

The I/O controller 810 may manage input and output signals for the device 805. The I/O controller 810 may also manage peripherals not integrated into the device 805. In some cases, the I/O controller 810 may represent a physical connection or port to an external peripheral. In some cases, the I/O controller 810 may utilize an operating system such as iOS®, ANDROID®, MS-DOS®, MS-WINDOWS®, OS/2®, UNIX®, LINUX®, or another known operating system. Additionally or alternatively, the I/O controller 810 may represent or interact with a modem, a keyboard, a mouse, a touchscreen, or a similar device. In some cases, the I/O controller 810 may be implemented as part of a processor, such as the processor 840. In some cases, a user may interact with the device 805 via the I/O controller 810 or via hardware components controlled by the I/O controller 810.

In some cases, the device 805 may include a single antenna 825. However, in some other cases, the device 805 may have more than one antenna 825, which may be capable of concurrently transmitting or receiving multiple wireless transmissions. The transceiver 815 may communicate bi-directionally, via the one or more antennas 825, wired, or wireless links as described herein. For example, the transceiver 815 may represent a wireless transceiver and may communicate bi-directionally with another wireless transceiver. The transceiver 815 may also include a modem to modulate the packets, to provide the modulated packets to one or more antennas 825 for transmission, and to demodulate packets received from the one or more antennas 825. The transceiver 815, or the transceiver 815 and one or more antennas 825, may be an example of a transmitter 515, a transmitter 615, a receiver 510, a receiver 610, or any combination thereof or component thereof, as described herein.

The memory 830 may include random access memory (RAM) and read-only memory (ROM). The memory 830 may store computer-readable, computer-executable code 835 including instructions that, when executed by the processor 840, cause the device 805 to perform various functions described herein. The code 835 may be stored in a non-transitory computer-readable medium such as system memory or another type of memory. In some cases, the code 835 may not be directly executable by the processor 840 but may cause a computer (e.g., when compiled and executed) to perform functions described herein. In some cases, the memory 830 may contain, among other things, a basic I/O system (BIOS) which may control basic hardware or software operation such as the interaction with peripheral components or devices.

The processor 840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In some other cases, a memory controller may be integrated into the processor 840. The processor 840 may be configured to execute computer-readable instructions stored in a memory (e.g., the memory 830) to cause the device 805 to perform various functions (e.g., functions or tasks supporting IUC for sidelink in an unlicensed or shared spectrum). For example, the device 805 or a component of the device 805 may include a processor 840 and memory 830 coupled with or to the processor 840, the processor 840 and memory 830 configured to perform various functions described herein.

The communications manager 820 may support wireless communication at a first UE in accordance with examples as disclosed herein. For example, the communications manager 820 may be configured as or otherwise support a means for receiving an IUC request message from a second UE, the IUC request message identifying a request for resource scheduling information for the first UE, the second UE, or both. The communications manager 820 may be configured as or otherwise support a means for transmitting an IUC response message including the scheduling information to the second UE, the scheduling information including an indication of one or more of a resource block set and interlacing pattern frequency configuration for multi-slot burst communications between the first UE and the second UE or a starting slot and slot burst length configuration for the multi-slot burst communications between the first UE and the second UE.

Additionally, or alternatively, the communications manager 820 may support wireless communication at a second UE in accordance with examples as disclosed herein. For example, the communications manager 820 may be configured as or otherwise support a means for transmitting an IUC request message from a first UE, the IUC request message identifying a request for resource scheduling information for the first UE, the second UE, or both. The communications manager 820 may be configured as or otherwise support a means for receiving an IUC response message including the scheduling information from the first UE, the scheduling information including an indication of one or more of a resource block set and interlacing pattern frequency configuration for multi-slot burst communications between the first UE and the second UE or a starting slot and slot burst length configuration for the multi-slot burst communications between the first UE and the second UE.

By including or configuring the communications manager 820 in accordance with examples as described herein, the device 805 may support techniques for improved IUC message content to support RB level resource signaling, starting slot and slot burst length indications, and other improvements to schedule multi-slot burst communications.

In some examples, the communications manager 820 may be configured to perform various operations (e.g., receiving, monitoring, transmitting) using or otherwise in cooperation with the transceiver 815, the one or more antennas 825, or any combination thereof. Although the communications manager 820 is illustrated as a separate component, in some examples, one or more functions described with reference to the communications manager 820 may be supported by or performed by the processor 840, the memory 830, the code 835, or any combination thereof. For example, the code 835 may include instructions executable by the processor 840 to cause the device 805 to perform various aspects of IUC for sidelink in an unlicensed or shared spectrum as described herein, or the processor 840 and the memory 830 may be otherwise configured to perform or support such operations.

Figure 9:
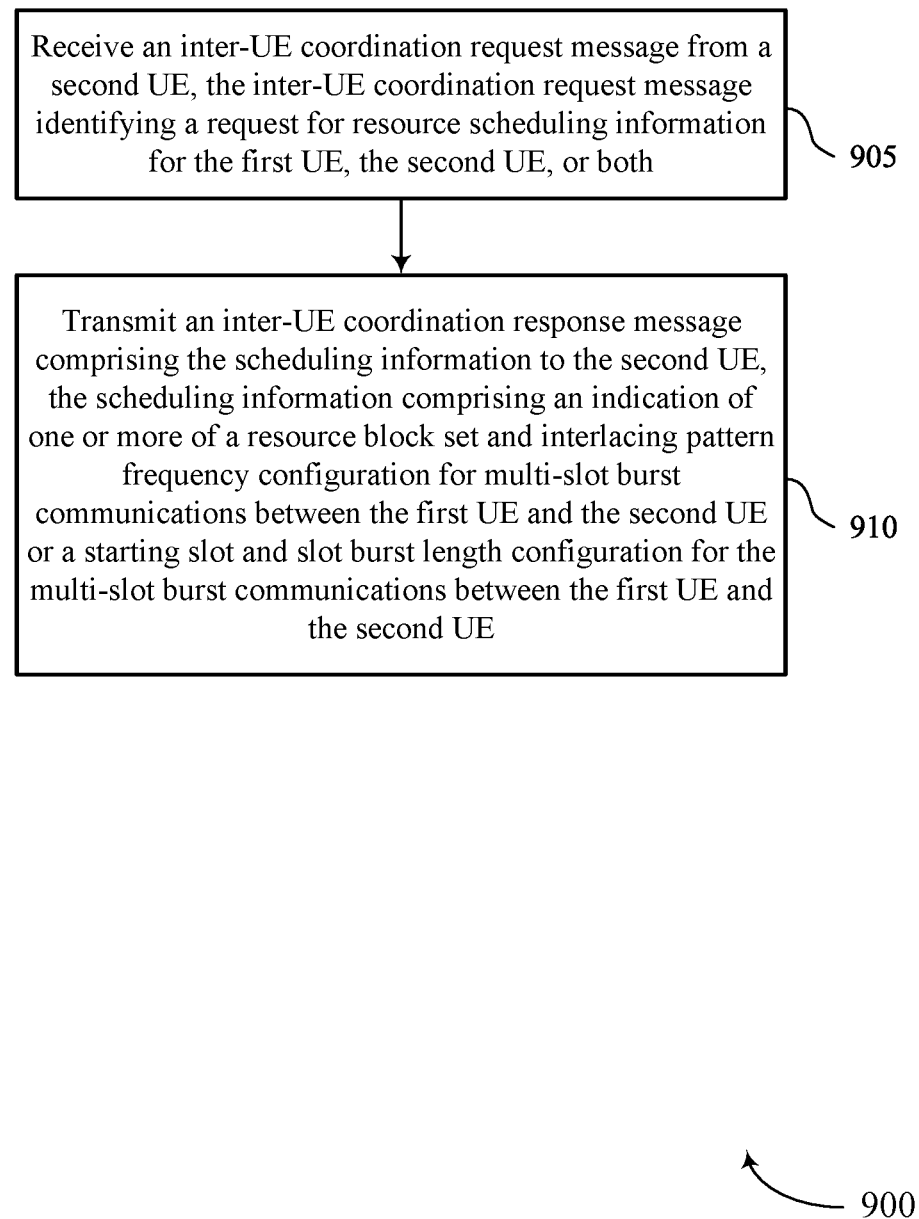
FIGS. 9 through 12 show flowcharts illustrating methods that support inter-UE coordination for sidelink in an unlicensed or shared spectrum in accordance with one or more aspects of the present disclosure.

FIG. 9 shows a flowchart illustrating a method 900 that supports IUC for sidelink in an unlicensed or shared spectrum in accordance with one or more aspects of the present disclosure. The operations of the method 900 may be implemented by a UE or its components as described herein. For example, the operations of the method 900 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 905, the method may include receiving an IUC request message from a second UE, the IUC request message identifying a request for resource scheduling information for the first UE, the second UE, or both. The operations of 905 may be performed in accordance with examples as disclosed herein. In some examples, aspects of the operations of 905 may be performed by an IUC request manager 725 as described with reference to FIG. 7.

At 910, the method may include transmitting an IUC response message including the scheduling information to the second UE, the scheduling information including an indication of one or more of a resource block set and interlacing pattern frequency configuration for multi-slot burst communications between the first UE and the second UE or a starting slot and slot burst length configuration for the multi-slot burst communications between the first UE and the second UE. The operations of 910 may be performed in accordance with examples as disclosed herein. In some examples, aspects of the operations of 910 may be performed by an IUC response manager 730 as described with reference to FIG. 7.

Figure 10:
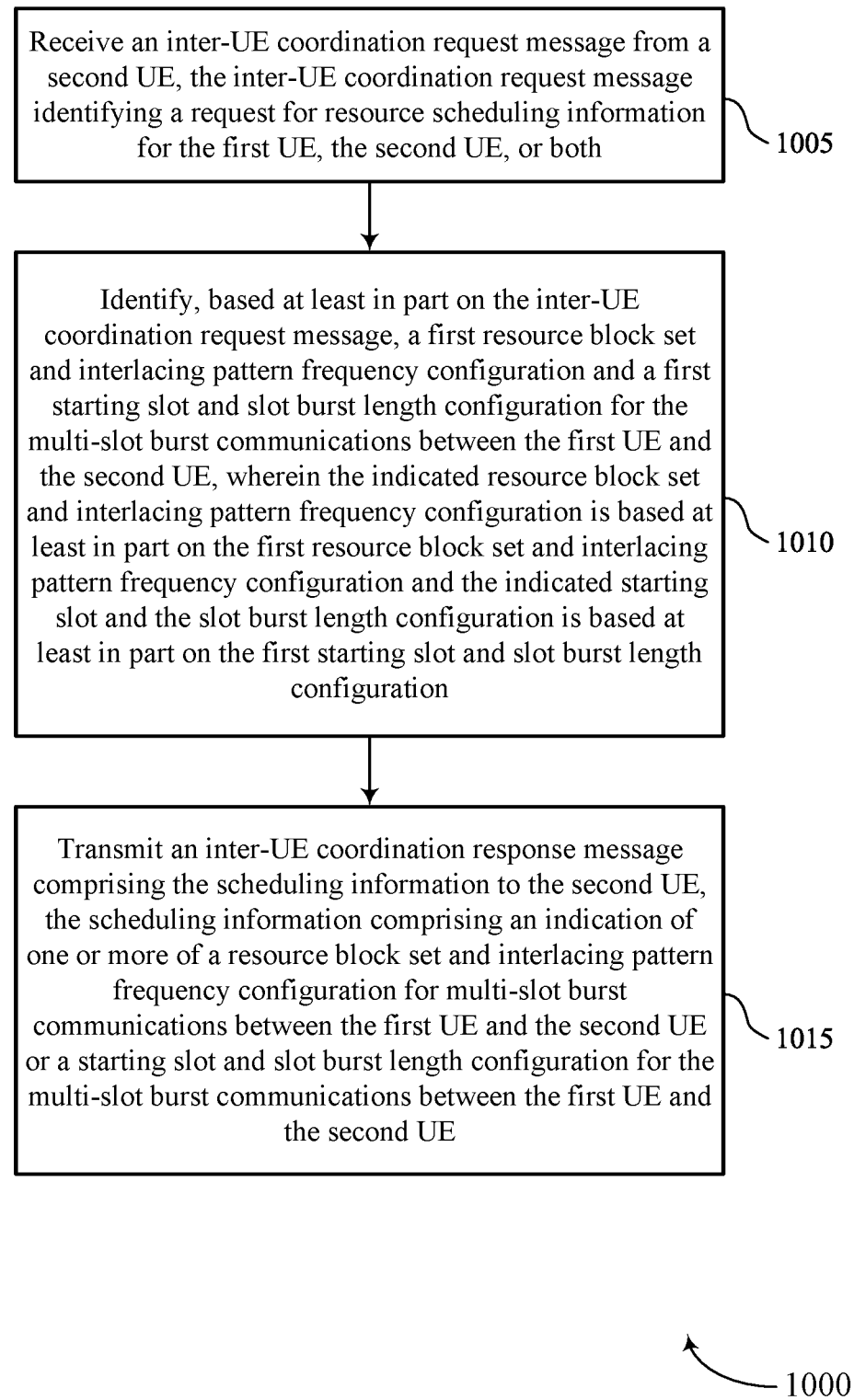

FIG. 10 shows a flowchart illustrating a method 1000 that supports IUC for sidelink in an unlicensed or shared spectrum in accordance with one or more aspects of the present disclosure. The operations of the method 1000 may be implemented by a UE or its components as described herein. For example, the operations of the method 1000 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1005, the method may include receiving an IUC request message from a second UE, the IUC request message identifying a request for resource scheduling information for the first UE, the second UE, or both. The operations of 1005 may be performed in accordance with examples as disclosed herein. In some examples, aspects of the operations of 1005 may be performed by an IUC request manager 725 as described with reference to FIG. 7.

At 1010, the method may include identifying, based on the IUC request message, a first resource block set and interlacing pattern frequency configuration and a first starting slot and slot burst length configuration for the multi-slot burst communications between the first UE and the second UE, where the indicated resource block set and interlacing pattern frequency configuration is based on the first resource block set and interlacing pattern frequency configuration and the indicated starting slot and the slot burst length configuration is based on the first starting slot and slot burst length configuration. The operations of 1010 may be performed in accordance with examples as disclosed herein. In some examples, aspects of the operations of 1010 may be performed by an IUC request frequency manager 735 as described with reference to FIG. 7.

At 1015, the method may include transmitting an IUC response message including the scheduling information to the second UE, the scheduling information including an indication of one or more of a resource block set and interlacing pattern frequency configuration for multi-slot burst communications between the first UE and the second UE or a starting slot and slot burst length configuration for the multi-slot burst communications between the first UE and the second UE. The operations of 1015 may be performed in accordance with examples as disclosed herein. In some examples, aspects of the operations of 1015 may be performed by an IUC response manager 730 as described with reference to FIG. 7.

Figure 11:
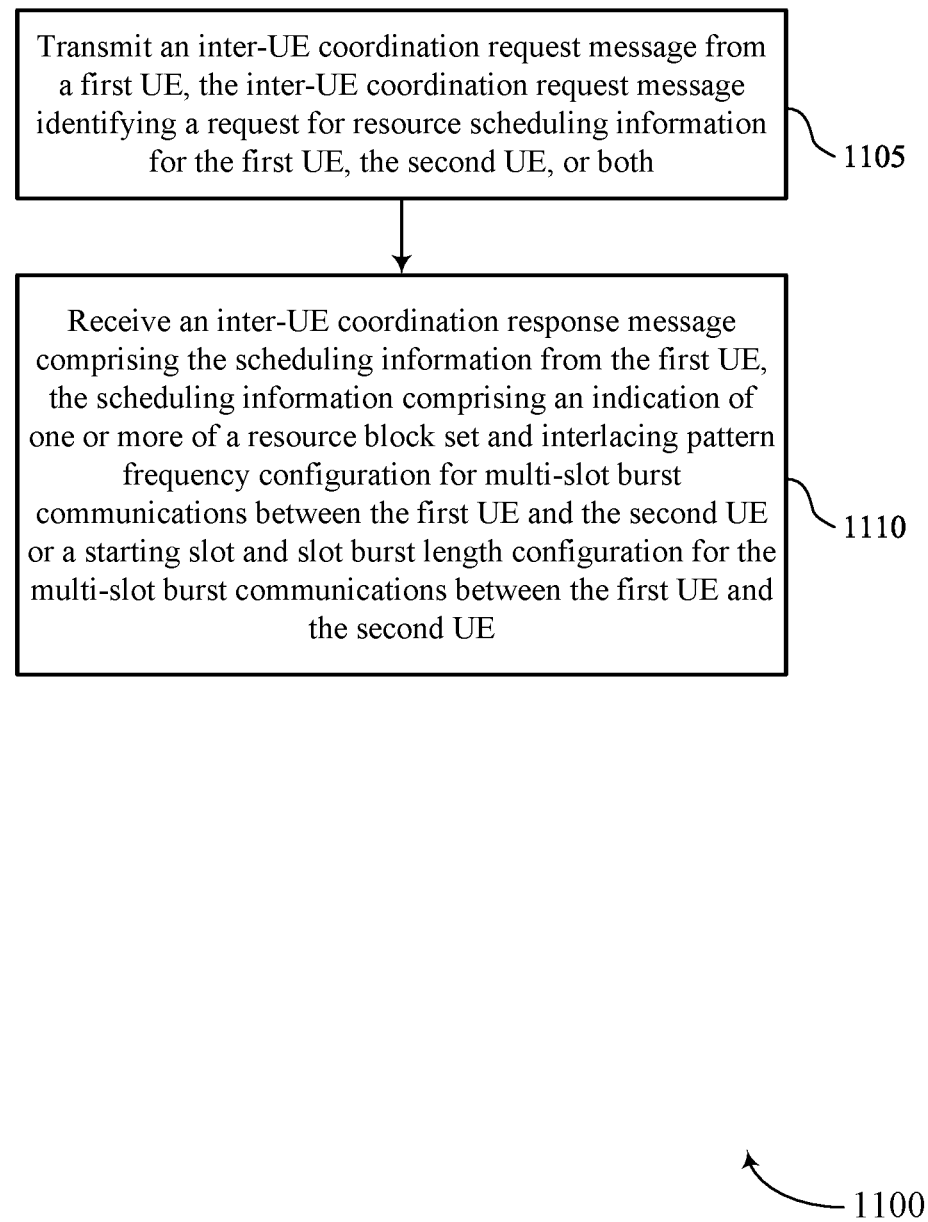

FIG. 11 shows a flowchart illustrating a method 1100 that supports IUC for sidelink in an unlicensed or shared spectrum in accordance with one or more aspects of the present disclosure. The operations of the method 1100 may be implemented by a UE or its components as described herein. For example, the operations of the method 1100 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1105, the method may include transmitting an IUC request message from a first UE, the IUC request message identifying a request for resource scheduling information for the first UE, the second UE, or both. The operations of 1105 may be performed in accordance with examples as disclosed herein. In some examples, aspects of the operations of 1105 may be performed by an IUC request manager 725 as described with reference to FIG. 7.

At 1110, the method may include receiving an IUC response message including the scheduling information from the first UE, the scheduling information including an indication of one or more of a resource block set and interlacing pattern frequency configuration for multi-slot burst communications between the first UE and the second UE or a starting slot and slot burst length configuration for the multi-slot burst communications between the first UE and the second UE. The operations of 1110 may be performed in accordance with examples as disclosed herein. In some examples, aspects of the operations of 1110 may be performed by an IUC response manager 730 as described with reference to FIG. 7.

Figure 12:
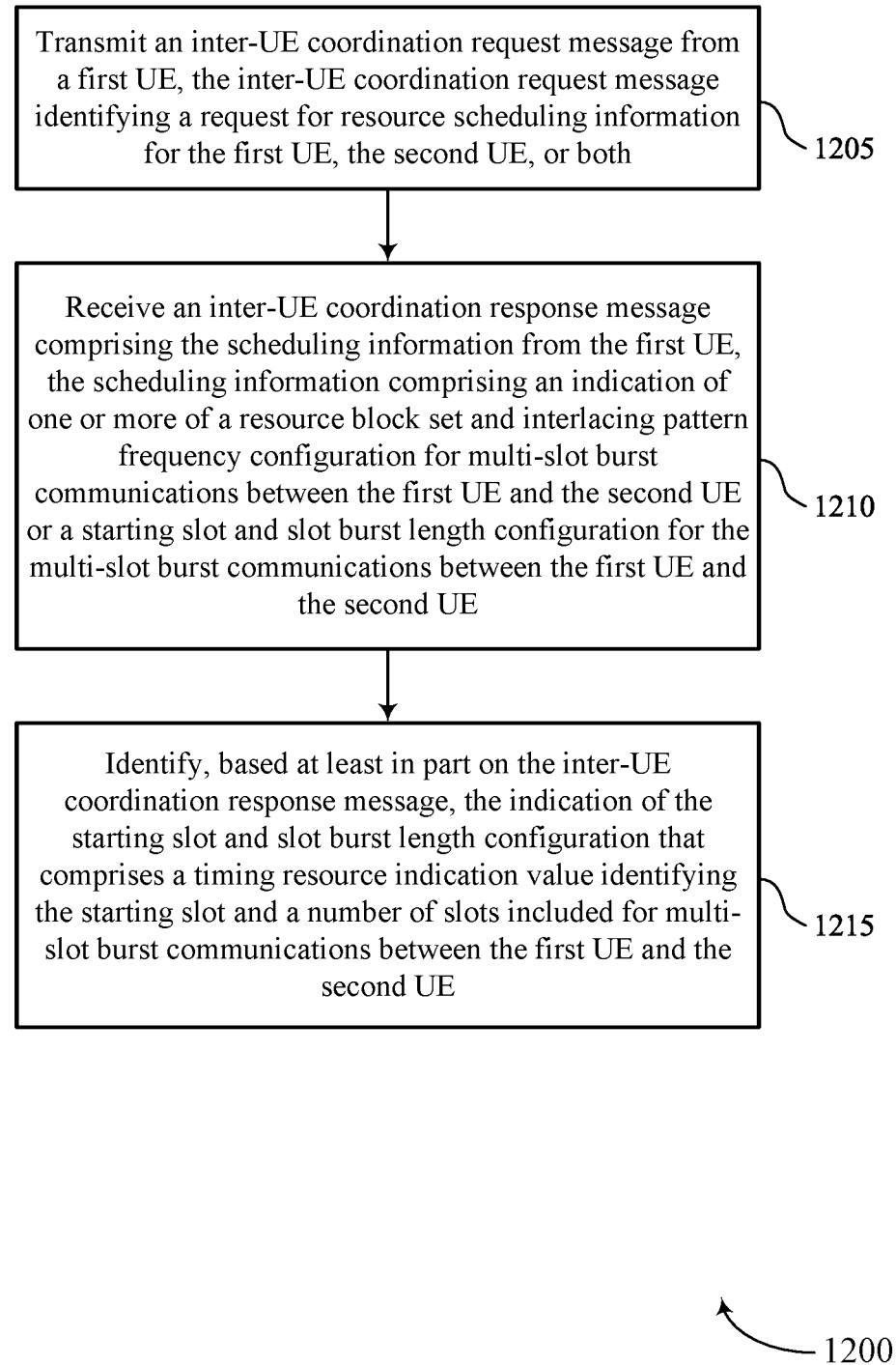

FIG. 12 shows a flowchart illustrating a method 1200 that supports IUC for sidelink in an unlicensed or shared spectrum in accordance with one or more aspects of the present disclosure. The operations of the method 1200 may be implemented by a UE or its components as described herein. For example, the operations of the method 1200 may be performed by a UE 115 as described with reference to FIGS. 1 through 8. In some examples, a UE may execute a set of instructions to control the functional elements of the UE to perform the described functions. Additionally, or alternatively, the UE may perform aspects of the described functions using special-purpose hardware.

At 1205, the method may include transmitting an IUC request message from a first UE, the IUC request message identifying a request for resource scheduling information for the first UE, the second UE, or both. The operations of 1205 may be performed in accordance with examples as disclosed herein. In some examples, aspects of the operations of 1205 may be performed by an IUC request manager 725 as described with reference to FIG. 7.

At 1210, the method may include receiving an IUC response message including the scheduling information from the first UE, the scheduling information including an indication of one or more of a resource block set and interlacing pattern frequency configuration for multi-slot burst communications between the first UE and the second UE or a starting slot and slot burst length configuration for the multi-slot burst communications between the first UE and the second UE. The operations of 1210 may be performed in accordance with examples as disclosed herein. In some examples, aspects of the operations of 1210 may be performed by an IUC response manager 730 as described with reference to FIG. 7.

At 1215, the method may include identifying, based on the IUC response message, the indication of the starting slot and slot burst length configuration that includes a timing resource indication value identifying the starting slot and a number of slots included for multi-slot burst communications between the first UE and the second UE. The operations of 1215 may be performed in accordance with examples as disclosed herein. In some examples, aspects of the operations of 1215 may be performed by an IUC timing manager 740 as described with reference to FIG. 7.

The following provides an overview of aspects of the present disclosure:

Aspect 1: A method for wireless communication at a first UE, comprising: receiving an IUC request message from a second UE, the IUC request message identifying a request for resource scheduling information for the first UE, the second UE, or both; and transmitting an IUC response message comprising the scheduling information to the second UE, the scheduling information comprising an indication of one or more of a RB set and interlacing pattern frequency configuration for multi-slot burst communications between the first UE and the second UE or a starting slot and slot burst length configuration for the multi-slot burst communications between the first UE and the second UE.

Aspect 2: The method of aspect 1, further comprising: identifying, based at least in part on the IUC request message, a first RB set and interlacing pattern frequency configuration and a first starting slot and slot burst length configuration for the multi-slot burst communications between the first UE and the second UE, wherein the indicated RB set and interlacing pattern frequency configuration is based at least in part on the first RB set and interlacing pattern frequency configuration and the indicated starting slot and the slot burst length configuration is based at least in part on the first starting slot and slot burst length configuration.

Aspect 3: The method of aspect 2, wherein the first RB set and interlacing pattern frequency configuration comprise a field indicating the starting RB set and number of continuous RB sets or a bitmap where each bit in the bitmap is configured to indicate the starting RB set and continuous or discontinuous RB sets.

Aspect 4: The method of any of aspects 2 through 3, wherein the first RB set and interlacing pattern frequency configuration comprises a starting RB set with a number of continuous or discontinuous RB sets and an interlacing pattern for the starting RB set and continuous or discontinuous RB sets.

Aspect 5: The method of any of aspects 2 through 4, wherein the first starting slot and slot burst length configuration comprises a timing resource indication value identifying the starting slot and a number of slots included for multi-slot burst communications between the first UE and the second UE.

Aspect 6: The method of any of aspects 1 through 5, wherein transmitting the IUC response message comprises: transmitting, in the IUC response message, the indication of the starting slot and slot burst length configuration that comprises a timing resource indication value identifying the starting slot and a number of slots included for multi-slot burst communications between the first UE and the second UE.

Aspect 7: The method of aspect 6, wherein the indication of the number of slots included for multi-slot burst communications comprises a shared indication of the number of slots that are included in each instance of the multi-slot burst communications, a first indication of the number of slots that are included in a first instance of the multi-slot burst communications and a second indication of the number of slots that are included in one or more additional instances of the multi-slot burst communications, or a separate indication of the number of slots that are included for each instance of the multi-slot burst communications.

Aspect 8: The method of any of aspects 6 through 7, wherein the indication of the number of slots included for the multi-slot burst communication comprises one or more fields indicating the number of slots included for the multi-slot burst communications, where each field of the one or more fields has a shared field length or a different field length.

Aspect 9: The method of any of aspects 6 through 8, wherein the indication of the timing resource indication value comprises an earliest starting slot for the multi-slot burst communications.

Aspect 10: The method of any of aspects 1 through 9, wherein transmitting the IUC response message comprises: transmitting, in the IUC response message, the indication of the RB set and interlacing pattern frequency configuration that comprises a starting RB set with a number of continuous or discontinuous RB sets and an interlacing pattern for the starting RB set and continuous or discontinuous RB sets.

Aspect 11: The method of aspect 10, wherein the indication of the interlacing pattern comprises an interlacing pattern for a starting interlacing pattern for a first instance of the multi-slot burst communications and a shared offset value identifying the offset between each instance of the multi-slot burst communications.

Aspect 12: The method of any of aspects 10 through 11, wherein the indication of the interlacing pattern comprises a bitmap where each bit in the bitmap is configured to identify a starting interlacing pattern for a first instance of the multi-slot burst communications and a separate offset value for each subsequent instance of the multi-slot burst communications identifying the offset between each instance.

Aspect 13: A method for wireless communication at a second UE, comprising: transmitting an IUC request message from a first UE, the IUC request message identifying a request for resource scheduling information for the first UE, the second UE, or both; and receiving an IUC response message comprising the scheduling information from the first UE, the scheduling information comprising an indication of one or more of a RB set and interlacing pattern frequency configuration for multi-slot burst communications between the first UE and the second UE or a starting slot and slot burst length configuration for the multi-slot burst communications between the first UE and the second UE.

Aspect 14: The method of aspect 13, further comprising: identifying, based at least in part on the IUC request message, a first RB set and interlacing pattern frequency configuration and a first starting slot and slot burst length configuration for the multi-slot burst communications between the first UE and the second UE, wherein the indicated RB set and interlacing pattern frequency configuration is based at least in part on the first RB set and interlacing pattern frequency configuration and the indicated starting slot and the slot burst length configuration is based at least in part on the first starting slot and slot burst length configuration.

Aspect 15: The method of aspect 14, wherein the first RB set and interlacing pattern frequency configuration comprise a field indicating the starting RB set and number of continuous RB sets or a bitmap where each bit in the bitmap is configured to indicate the starting RB set and continuous or discontinuous RB sets.

Aspect 16: The method of any of aspects 14 through 15, wherein the first RB set and interlacing pattern frequency configuration comprises a starting RB set with a number of continuous or discontinuous RB sets and an interlacing pattern for the starting RB set and continuous or discontinuous RB sets.

Aspect 17: The method of any of aspects 14 through 16, wherein the first starting slot and slot burst length configuration comprises a timing resource indication value identifying the starting slot and a number of slots included for multi-slot burst communications between the first UE and the second UE.

Aspect 18: [Proposal 2] The method of any of aspects 13 through 17, further comprising: identifying, based at least in part on the IUC response message, the indication of the starting slot and slot burst length configuration that comprises a timing resource indication value identifying the starting slot and a number of slots included for multi-slot burst communications between the first UE and the second UE.

Aspect 19: The method of aspect 18, wherein the indication of the number of slots included for multi-slot burst communications comprises a shared indication of the number of slots that are included in each instance of the multi-slot burst communications, a first indication of the number of slots that are included in a first instance of the multi-slot burst communications and a second indication of the number of slots that are included in one or more additional instances of the multi-slot burst communications, or a separate indication of the number of slots that are included for each instance of the multi-slot burst communications.

Aspect 20: The method of any of aspects 18 through 19, wherein the indication of the number of slots included for the multi-slot burst communication comprises one or more fields indicating the number of slots included for the multi-slot burst communications, where each field of the one or more fields has a shared field length or a different field length.

Aspect 21: The method of any of aspects 18 through 20, wherein the indication of the timing resource indication value comprises an earliest starting slot for the multi-slot burst communications.

Aspect 22: The method of any of aspects 13 through 21, further comprising: identifying, based at lest in part on the IUC response message, the indication of the RB set and interlacing pattern frequency configuration that comprises a starting RB set with a number of continuous or discontinuous RB sets and an interlacing pattern for the starting RB set and continuous or discontinuous RB sets.

Aspect 23: The method of aspect 22, wherein the indication of the interlacing pattern comprises an interlacing pattern for a starting interlacing pattern for a first instance of the multi-slot burst communications and a shared offset value identifying the offset between each instance of the multi-slot burst communications.

Aspect 24: The method of any of aspects 22 through 23, wherein the indication of the interlacing pattern comprises a bitmap where each bit in the bitmap is configured to identify a starting interlacing pattern for a first instance of the multi-slot burst communications and a separate offset value for each subsequent instance of the multi-slot burst communications identifying the offset between each instance.

Aspect 25: An apparatus for wireless communication at a first UE, comprising a processor; memory in electronic communication with the processor; and instructions stored in the memory, wherein the instructions are executable by the processor to perform a method of any of aspects 1 through 12.

Aspect 26: An apparatus for wireless communication at a first UE, comprising at least one means for performing a method of any of aspects 1 through 12.

Aspect 27: A non-transitory computer-readable medium storing code for wireless communication at a first UE, the code comprising instructions executable by a processor to perform a method of any of aspects 1 through 12.

Aspect 28: An apparatus for wireless communication at a second UE, comprising a processor; memory in electronic communication with the processor; and instructions stored in the memory, wherein the instructions are executable by the processor to perform a method of any of aspects 13 through 24.

Aspect 29: An apparatus for wireless communication at a second UE, comprising at least one means for performing a method of any of aspects 13 through 24.

Aspect 30: A non-transitory computer-readable medium storing code for wireless communication at a second UE, the code comprising instructions executable by a processor to perform a method of any of aspects 13 through 24.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a first user equipment (UE), comprising:
a processor;
memory in electronic communication with the processor; and
instructions stored in the memory, wherein the instructions are executable by the processor to:
receive an inter-UE coordination request message from a second UE, the inter-UE coordination request message identifying a request for resource scheduling information for the first UE, the second UE, or both, and the inter-UE coordination request message indicating a requested starting slot and a requested burst length for multi-slot burst communications between the first UE and the second UE; and
transmit, in accordance with the inter-UE request message, an inter-UE coordination response message comprising the scheduling information to the second UE, the scheduling information comprising an indication of one or more of a resource block set and interlacing pattern frequency configuration for multi-slot burst communications between the first UE and the second UE or a starting slot and slot burst length configuration for the multi-slot burst communications between the first UE and the second UE, the scheduling information in accordance with the requested starting slot and the requested burst length.

2. The apparatus of claim 1, wherein the instructions are further executable by the processor to:
identify, in accordance with the inter-UE coordination request message, a first resource block set and interlacing pattern frequency configuration and a first starting slot and slot burst length configuration for the multi-slot burst communications between the first UE and the second UE, the indicated resource block set and interlacing pattern frequency configuration in accordance with the first resource block set and interlacing pattern frequency configuration and the indicated starting slot and the slot burst length configuration is in accordance with the first starting slot and slot burst length configuration.

3. The apparatus of claim 2, wherein the first resource block set and interlacing pattern frequency configuration comprise a field indicating the starting resource block set and number of continuous resource block sets or a bitmap where each bit in the bitmap is configured to indicate the starting resource block set and continuous or discontinuous resource block sets.

4. The apparatus of claim 2, wherein the first resource block set and interlacing pattern frequency configuration comprises a starting resource block set with a number of continuous or discontinuous resource block sets and an interlacing pattern for the starting resource block set and continuous or discontinuous resource block sets.

5. The apparatus of claim 2, wherein the first starting slot and slot burst length configuration comprises a timing resource indication value identifying the starting slot and a number of slots included for multi-slot burst communications between the first UE and the second UE.

6. The apparatus of claim 1, wherein the instructions executable by the processor to transmit the inter-UE coordination response message comprise instructions executable by the processor to:
transmit, in the inter-UE coordination response message, the indication of the starting slot and slot burst length configuration that comprises a timing resource indication value identifying the starting slot and a number of slots included for multi-slot burst communications between the first UE and the second UE.

7. The apparatus of claim 6, wherein the indication of the number of slots included for multi-slot burst communications comprises a shared indication of the number of slots that are included in each instance of the multi-slot burst communications, a first indication of the number of slots that are included in a first instance of the multi-slot burst communications and a second indication of the number of slots that are included in one or more additional instances of the multi-slot burst communications, or a separate indication of the number of slots that are included for each instance of the multi-slot burst communications.

8. The apparatus of claim 6, wherein the indication of the number of slots included for the multi-slot burst communication comprises one or more fields indicating the number of slots included for the multi-slot burst communications, where each field of the one or more fields has a shared field length or a different field length.

9. The apparatus of claim 6, wherein the indication of the timing resource indication value comprises an earliest starting slot for the multi-slot burst communications.

10. The apparatus of claim 1, wherein the instructions executable by the processor to transmit the inter-UE coordination response message comprise instructions executable by the processor to:
transmit, in the inter-UE coordination response message, the indication of the resource block set and interlacing pattern frequency configuration that comprises a starting resource block set with a number of continuous or discontinuous resource block sets and an interlacing pattern for the starting resource block set and continuous or discontinuous resource block sets.

11. The apparatus of claim 10, wherein the indication of the interlacing pattern comprises an interlacing pattern for a starting interlacing pattern for a first instance of the multi-slot burst communications and a shared offset value identifying the offset between each instance of the multi-slot burst communications.

12. The apparatus of claim 10, wherein the indication of the interlacing pattern comprises a bitmap where each bit in the bitmap is configured to identify a starting interlacing pattern for a first instance of the multi-slot burst communications and a separate offset value for each subsequent instance of the multi-slot burst communications identifying the offset between each instance.

13. An apparatus for wireless communications at a second user equipment (UE), comprising:
a processor;
memory in electronic communication with the processor; and
instructions stored in the memory, wherein the instructions are executable by the processor to:
transmit an inter-UE coordination request message from a first UE, the inter-UE coordination request message identifying a request for resource scheduling information for the first UE, the second UE, or both, the inter-UE coordination request message indicating a requested starting slot and a requested burst length for multi-slot burst communications between the first UE and the second UE; and
receive, in accordance with the inter-UE request message, an inter-UE coordination response message comprising the scheduling information from the first UE, the scheduling information comprising an indication of one or more of a resource block set and interlacing pattern frequency configuration for multi-slot burst communications between the first UE and the second UE or a starting slot and slot burst length configuration for the multi-slot burst communications between the first UE and the second UE, the scheduling information in accordance with the requested starting slot and the requested burst length.

14. The apparatus of claim 13, wherein the instructions are further executable by the processor to:
identify, in accordance with the inter-UE coordination request message, a first resource block set and interlacing pattern frequency configuration and a first starting slot and slot burst length configuration for the multi-slot burst communications between the first UE and the second UE, the indicated resource block set and interlacing pattern frequency configuration in accordance with the first resource block set and interlacing pattern frequency configuration and the indicated starting slot and the slot burst length configuration is in accordance with the first starting slot and slot burst length configuration.

15. The apparatus of claim 14, wherein the first resource block set and interlacing pattern frequency configuration comprise a field indicating the starting resource block set and number of continuous resource block sets or a bitmap where each bit in the bitmap is configured to indicate the starting resource block set and continuous or discontinuous resource block sets.

16. The apparatus of claim 14, wherein the first resource block set and interlacing pattern frequency configuration comprises a starting resource block set with a number of continuous or discontinuous resource block sets and an interlacing pattern for the starting resource block set and continuous or discontinuous resource block sets.

17. The apparatus of claim 14, wherein the first starting slot and slot burst length configuration comprises a timing resource indication value identifying the starting slot and a number of slots included for multi-slot burst communications between the first UE and the second UE.

18. The apparatus of claim 13, wherein the instructions are further executable by the processor to:
identify, in accordance with the inter-UE coordination response message, the indication of the starting slot and slot burst length configuration that comprises a timing resource indication value identifying the starting slot and a number of slots included for multi-slot burst communications between the first UE and the second UE.

19. The apparatus of claim 18, wherein the indication of the number of slots included for multi-slot burst communications comprises a shared indication of the number of slots that are included in each instance of the multi-slot burst communications, a first indication of the number of slots that are included in a first instance of the multi-slot burst communications and a second indication of the number of slots that are included in one or more additional instances of the multi-slot burst communications, or a separate indication of the number of slots that are included for each instance of the multi-slot burst communications.

20. The apparatus of claim 18, wherein the indication of the number of slots included for the multi-slot burst communication comprises one or more fields indicating the number of slots included for the multi-slot burst communications, where each field of the one or more fields has a shared field length or a different field length.

21. The apparatus of claim 18, wherein the indication of the timing resource indication value comprises an earliest starting slot for the multi-slot burst communications.

22. The apparatus of claim 13, wherein the instructions are further executable by the processor to:
identify, in accordance with the inter-UE coordination response message, the indication of the resource block set and interlacing pattern frequency configuration that comprises a starting resource block set with a number of continuous or discontinuous resource block sets and an interlacing pattern for the starting resource block set and continuous or discontinuous resource block sets.

23. The apparatus of claim 22, wherein the indication of the interlacing pattern comprises an interlacing pattern for a starting interlacing pattern for a first instance of the multi-slot burst communications and a shared offset value identifying the offset between each instance of the multi-slot burst communications.

24. The apparatus of claim 22, wherein the indication of the interlacing pattern comprises a bitmap where each bit in the bitmap is configured to identify a starting interlacing pattern for a first instance of the multi-slot burst communications and a separate offset value for each subsequent instance of the multi-slot burst communications identifying the offset between each instance.

25. A method for wireless communications at a first user equipment (UE), comprising:
receiving an inter-UE coordination request message from a second UE, the inter-UE coordination request message identifying a request for resource scheduling information for the first UE, the second UE, or both, the inter-UE coordination request message indicating a requested starting slot and a requested burst length for multi-slot burst communications between the first UE and the second UE; and
transmitting, in accordance with the inter-UE request message, an inter-UE coordination response message comprising the scheduling information to the second UE, the scheduling information comprising an indication of one or more of a resource block set and interlacing pattern frequency configuration for multi-slot burst communications between the first UE and the second UE or a starting slot and slot burst length configuration for the multi-slot burst communications between the first UE and the second UE, the scheduling information in accordance with the requested burst length.

26. The method of claim 25, further comprising:
identifying, in accordance with the inter-UE coordination request message, a first resource block set and interlacing pattern frequency configuration and a first starting slot and slot burst length configuration for the multi-slot burst communications between the first UE and the second UE, the indicated resource block set and interlacing pattern frequency configuration in accordance with the first resource block set and interlacing pattern frequency configuration and the indicated starting slot and the slot burst length configuration is in accordance with the first starting slot and slot burst length configuration.

27. The method of claim 25, wherein transmitting the inter-UE coordination response message comprises:
transmitting, in the inter-UE coordination response message, the indication of the starting slot and slot burst length configuration that comprises a timing resource indication value identifying the starting slot and a number of slots included for multi-slot burst communications between the first UE and the second UE.

28. The method of claim 25, wherein transmitting the inter-UE coordination response message comprises:
transmitting, in the inter-UE coordination response message, the indication of the resource block set and interlacing pattern frequency configuration that comprises a starting resource block set with a number of continuous or discontinuous resource block sets and an interlacing pattern for the starting resource block set and continuous or discontinuous resource block sets.

29. A method for wireless communications at a second user equipment (UE), comprising:
transmitting an inter-UE coordination request message from a first UE, the inter-UE coordination request message identifying a request for resource scheduling information for the first UE, the second UE, or both, the inter-UE coordination request message indicating a requested starting slot and a requested burst length for multi-slot burst communications between the first UE and the second UE; and
receiving, in accordance with the inter-UE request message, an inter-UE coordination response message comprising the scheduling information from the first UE, the scheduling information comprising an indication of one or more of a resource block set and interlacing pattern frequency configuration for multi-slot burst communications between the first UE and the second UE or a starting slot and slot burst length configuration for the multi-slot burst communications between the first UE and the second UE, the scheduling information in accordance with the requested starting slot and the requested burst length.

30. The method of claim 29, further comprising:
identifying, in accordance with the inter-UE coordination request message, a first resource block set and interlacing pattern frequency configuration and a first starting slot and slot burst length configuration for the multi-slot burst communications between the first UE and the second UE, the indicated resource block set and interlacing pattern frequency configuration in accordance with the first resource block set and interlacing pattern frequency configuration and the indicated starting slot and the slot burst length configuration is in accordance with the first starting slot and slot burst length configuration.

* * * * *